(12) United States Patent
Asada et al.

(10) Patent No.: US 11,196,114 B2
(45) Date of Patent: *Dec. 7, 2021

(54) SURFACE-TREATED STEEL PLATE FOR CELL CONTAINER

(71) Applicant: TOYO KOHAN CO., LTD., Tokyo (JP)

(72) Inventors: Kengo Asada, Yamaguchi (JP); Masao Suda, Yamaguchi (JP); Kota Sadaki, Yamaguchi (JP); Hideyuki Minagi, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 251 days.

This patent is subject to a terminal disclaimer.

(21) Appl. No.: 15/780,935

(22) PCT Filed: Dec. 5, 2016

(86) PCT No.: PCT/JP2016/086119
§ 371 (c)(1),
(2) Date: Jul. 6, 2018

(87) PCT Pub. No.: WO2017/094919
PCT Pub. Date: Jun. 8, 2017

(65) Prior Publication Data
US 2018/0351138 A1    Dec. 6, 2018

(30) Foreign Application Priority Data

Dec. 3, 2015 (JP) .............................. JP2015-236710

(51) Int. Cl.
*H01M 2/10* (2006.01)
*H01M 2/02* (2006.01)
(Continued)

(52) U.S. Cl.
CPC ......... *H01M 50/124* (2021.01); *B32B 15/013* (2013.01); *B32B 15/015* (2013.01);
(Continued)

(58) Field of Classification Search
CPC ... C25D 7/00; C25D 5/50; C25D 5/48; C25D 3/12; C23C 30/00; C23C 30/005;
(Continued)

(56) References Cited

U.S. PATENT DOCUMENTS

2005/0089752 A1    4/2005 Ohmura et al.
2006/0083981 A1    4/2006 Mori et al.
(Continued)

FOREIGN PATENT DOCUMENTS

CN    1314009 A    9/2001
CN    1647293 A    7/2005
(Continued)

OTHER PUBLICATIONS

Office Action dated Dec. 10, 2019 in U.S. Appl. No. 15/780,862, 27 pages.
(Continued)

*Primary Examiner* — Michael E. La Villa
(74) *Attorney, Agent, or Firm* — Muncy, Geissler, Olds & Lowe, P.C.

(57) ABSTRACT

A surface-treated steel sheet for a battery container, including a steel sheet, an iron-nickel diffusion layer formed on the steel sheet, and a nickel layer formed on the iron-nickel diffusion layer and constituting the outermost layer, wherein when the Fe intensity and the Ni intensity are continuously measured from the surface of the surface-treated steel sheet for a battery container along the depth direction with a high frequency glow discharge optical emission spectrometric analyzer, the thickness of the iron-nickel diffusion layer being the difference between the depth at which the Fe
(Continued)

intensity exhibits a first predetermined value and the depth at which the Ni intensity exhibits a second predetermined value is 0.04 to 0.31 µm; and the total amount of the nickel contained in the iron-nickel diffusion layer and the nickel contained in the nickel layer is 4.4 g/m² or more and less than 10.8 g/m².

5 Claims, 15 Drawing Sheets

(51) Int. Cl.

| | | |
|---|---|---|
| C25D 5/50 | (2006.01) | |
| C23C 28/00 | (2006.01) | |
| B32B 15/00 | (2006.01) | |
| H01M 50/10 | (2021.01) | |
| H01M 50/124 | (2021.01) | |
| C25D 7/00 | (2006.01) | |
| C23C 28/02 | (2006.01) | |
| C23C 10/20 | (2006.01) | |
| C23C 10/30 | (2006.01) | |
| C23C 10/02 | (2006.01) | |
| C23C 10/18 | (2006.01) | |
| C23C 10/28 | (2006.01) | |
| C25D 5/48 | (2006.01) | |
| B32B 15/04 | (2006.01) | |
| C23C 10/08 | (2006.01) | |
| C23C 30/00 | (2006.01) | |
| B32B 15/18 | (2006.01) | |
| B32B 15/01 | (2006.01) | |
| C23C 10/60 | (2006.01) | |
| H01M 50/107 | (2021.01) | |
| H01M 50/116 | (2021.01) | |
| H01M 50/213 | (2021.01) | |
| C25D 3/12 | (2006.01) | |
| H01M 50/131 | (2021.01) | |
| H01M 50/155 | (2021.01) | |

(52) U.S. Cl.
CPC ........... *B32B 15/04* (2013.01); *B32B 15/043* (2013.01); *B32B 15/18* (2013.01); *C23C 10/02* (2013.01); *C23C 10/08* (2013.01); *C23C 10/18* (2013.01); *C23C 10/20* (2013.01); *C23C 10/28* (2013.01); *C23C 10/30* (2013.01); *C23C 10/60* (2013.01); *C23C 28/02* (2013.01); *C23C 28/021* (2013.01); *C23C 28/023* (2013.01); *C23C 30/00* (2013.01); *C23C 30/005* (2013.01); *C25D 3/12* (2013.01); *C25D 5/48* (2013.01); *C25D 5/50* (2013.01); *C25D 7/00* (2013.01); *H01M 50/10* (2021.01); *H01M 50/107* (2021.01); *H01M 50/116* (2021.01); *H01M 50/1245* (2021.01); *H01M 50/213* (2021.01); *B32B 2250/03* (2013.01); *B32B 2311/22* (2013.01); *B32B 2311/30* (2013.01); *B32B 2439/00* (2013.01); *H01M 50/131* (2021.01); *H01M 50/155* (2021.01); *Y02E 60/10* (2013.01); *Y10T 428/12937* (2015.01); *Y10T 428/12944* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01); *Y10T 428/12993* (2015.01); *Y10T 428/2495* (2015.01); *Y10T 428/24942* (2015.01); *Y10T 428/24967* (2015.01); *Y10T 428/24975* (2015.01); *Y10T 428/263* (2015.01); *Y10T 428/264* (2015.01); *Y10T 428/265* (2015.01); *Y10T 428/27* (2015.01)

(58) Field of Classification Search
CPC ..... C23C 28/023; C23C 28/02; C23C 28/021; C23C 10/02; C23C 10/18; C23C 10/20; C23C 10/28; C23C 10/30; C23C 10/08; C23C 10/60; H01M 2/02; H01M 2/0287; H01M 2/0486; H01M 2/022; H01M 2/026; H01M 2/0292; H01M 2/1055; H01M 2002/0297; H01M 50/1245; H01M 50/124; H01M 50/10; H01M 50/107; H01M 50/116; H01M 50/213; H01M 50/131; H01M 50/155; Y10T 428/12951; Y10T 428/12958; Y10T 428/12965; Y10T 428/12972; Y10T 428/12937; Y10T 428/12979; Y10T 428/12993; Y10T 428/24942; Y10T 428/2495; Y10T 428/24967; Y10T 428/24975; Y10T 428/263; Y10T 428/264; Y10T 428/265; Y10T 428/27; Y10T 428/12944; Y02E 60/10

See application file for complete search history.

(56) References Cited

U.S. PATENT DOCUMENTS

| | | |
|---|---|---|
| 2008/0305392 A1 | 12/2008 | Ohmura et al. |
| 2009/0311595 A1 | 12/2009 | Mori et al. |
| 2011/0159355 A1 | 6/2011 | Ohmura et al. |
| 2012/0231329 A1 | 9/2012 | Ohmura et al. |
| 2014/0147735 A1 | 5/2014 | Ohmura et al. |
| 2015/0162576 A1 | 6/2015 | Horie et al. |
| 2018/0351138 A1 | 12/2018 | Asada et al. |
| 2018/0366691 A1 | 12/2018 | Sadaki et al. |
| 2021/0151824 A1* | 5/2021 | Sadaki ............... C25D 5/48 |

FOREIGN PATENT DOCUMENTS

| | | |
|---|---|---|
| CN | 103597626 A | 2/2014 |
| CN | 108291323 A | 7/2018 |
| CN | 108368628 A | 8/2018 |
| CN | 108368629 A | 8/2018 |
| EP | 1498963 A1 | 1/2005 |
| EP | 2441532 A1 | 4/2012 |
| EP | 2472631 A1 | 7/2012 |
| JP | 06002104 | 1/1994 |
| JP | 2006093095 | 4/2006 |
| JP | 4817724 B2 | 11/2011 |
| JP | 2013170308 | 9/2013 |
| JP | 20149401 | 1/2014 |
| WO | WO03098718 A1 | 11/2003 |
| WO | WO2009107318 A1 | 9/2009 |
| WO | WO2014007025 A1 | 1/2014 |
| WO | WO2014156002 | 10/2014 |

OTHER PUBLICATIONS

Office Action dated Mar. 26, 2020 in related U.S. Appl. No. 15/780,862.
Office Action dated Mar. 17, 2020 in related CN Application No. 201680070718.5.
European Search Report dated Mar. 14, 2019 in EP App. No. 16870853.5.
European Search Report dated Mar. 14, 2019 in EP App. No. 16870854.3.
European Search Report dated Apr. 4, 2019 in EP App. No. 16870855.0.
Office Action of U.S. Appl. No. 15/780,929, dated Oct. 3, 2019, 13 pages.

(56) References Cited

OTHER PUBLICATIONS

European Office Action cited in counterpart application No. 16 870 853.5, dated Feb. 19, 2020, 4 pages.
European Office Action cited in counterpart application No. 16 870 854.3, dated Feb. 19, 2020, 4 pages.
European Office Action cited in counterpart application No. 16 870 855.0, dated Feb. 19, 2020, 4 pages.
Chinese Office Action in application No. 201680070719.X dated Jul. 16, 2019 and its English translation; pp. 1-13.
Chinese Office Action dated Jul. 3, 2019 in CN Application No. 201680070779.1.
Official Action issued in corresponding CN patent application No. 201680070779.1 dated May 12, 2020 (with English translation).
Official Action issued in corresponding JP patent application No. 2017-554215 dated Jun. 30. 2020 (with English translation).
Official Action issued in corresponding JP patent application No. 2017-554216 dated Jun. 30. 2020 (with English translation).
Official Action issued in corresponding JP patent application No. 2017-554217 dated Jun. 30, 2020 (with English translation).
Official Action issued in corresponding U.S. Appl. No. 15/780.929 dated Jun. 19, 2020.
Panasonic Industrial AA (LR6XWA) Data Sheet downloaded from https://b2b-api.panasonic.eu/file_stream/pids/fileversion/3678; Jun. 19, 2009, 2 pages.
Office Action dated Aug. 10, 2020 in CN Application No. 201680070719.X (14 pages).
Chinese Office Action with English translation cited in counterpart application No. 201680070718.5 dated Sep. 24, 2020, 13 pages.

\* cited by examiner (A) Reference Example A (430°C)

(B) Example 1 (600°C)

(C) Comparative Example 1 (not performing heat treatment)

(D) Comparative Example 2 (700°C)

(A) Reference Example A (430°C)

(B) Example 1 (600°C)

(C) Comparative Example 1 (not performing heat treatment)

(D) Comparative Example 2 (700°C)

(A) Reference Example 1
(not performing heat treatment)

(B) Reference Example 3 (400°C)

(C) Reference Example 5 (600°C)

(D) Reference Example 6 (700°C)

(E) Reference Example 7 (800°C)

(A) Reference Example 1
    (not performing heat treatment)

(B) Reference Example 3 (400°C)

(C) Reference Example 5 (600°C)

(D) Reference Example 6 (700°C)

(E) Reference Example 7 (800°C)

SURFACE-TREATED STEEL PLATE FOR CELL CONTAINER

TECHNICAL FIELD

The present invention relates to a surface-treated steel sheet for a battery container.

BACKGROUND ART

Recently, portable devices such as audio instruments and cellular phones have been used in various fields, and there have been used as the operating power sources thereof many primary batteries such as alkaline batteries and many secondary batteries such as nickel-hydrogen batteries and lithiumn-ion batteries. Such batteries are demanded to achieve long operating lives, high performances and the like by the achievement of high performances of the devices being mounted with such batteries, and the battery containers packed with power generation elements composed of positive electrode active materials, negative electrode active materials and the like are also demanded to be improved in the performances as the important constituent elements of the batteries.

As the surface-treated steel sheets to form such battery containers, for example, Patent Documents 1 and 2 disclose surface-treated steel sheets each prepared by forming a nickel plating layer on a steel sheet, and then forming an iron-nickel diffusion layer by applying a heat treatment to the nickel plated steel sheet.

On the other hand, battery containers having a thin battery container wall (hereinafter, referred to as "can wall") have been demanded in order to improve the volume percentage, under the requirements for the achievement of higher capacities and lighter weights of batteries. For example, as disclosed in Patent Documents 3 and 4, it has been known a processing allowing the thickness of the can wall after the processing to be thinner than the thickness of a surface-treated steel sheet before the processing.

RELATED ART

Patent Documents

Patent Document 1: Japanese Patent Laid-Open No. 2014-009401
Patent Document 2: Japanese Patent Laid-Open No. 6-2104
Patent Document 3: International Publication No. WO 2009/107318
Patent Document 4: International Publication No. WO 2014/156002

SUMMARY OF THE INVENTION

Problem to be Solved by the Invention

However, in Patent Documents 1 and 2, the heat treatment condition in the formation of the iron-nickel diffusion layer is a high temperature or a long time, and the inter-diffusion between the iron in the steel sheet serving as a substrate and the nickel in the nickel plating layer tends to proceed in the resulting surface-treated steel sheet. The present inventors have obtained a finding that when a heat treatment is performed under the conventional heat treatment conditions, use of a battery with the surface treated steel sheet processed into a battery container sometimes increases the amount of iron dissolved from the inner surface of the battery container, and the corrosion resistance is liable to be decreased. The iron exposed during formation of the battery container is favorable for improving the battery properties; however a study performed by the present inventors have revealed that when thickness of the nickel plating layer formed before heat treatment is thin, the exposure of the iron is locally increased. With increased dissolution amount, the corrosion resistance is liable to be decreased.

In addition, in Patent Documents 3 and 4, there is a problem that by reducing the thickness of the can wall of the battery container, the amount of iron dissolved on the inner surface of the battery container sometimes comes to be increased, and the corrosion resistance of the inner surface of the battery container is decreased.

An object of the present invention is to provide a surface-treated steel sheet for a battery container excellent in corrosion resistance even when the volume percentage is improved by reducing the thickness of the can wall in the case where the surface-treated steel sheet is processed into a battery container.

Means for Solving the Problem

According to the present invention, there is provided a surface-treated steel sheet for a battery container, including a steel sheet, an iron-nickel diffusion layer formed on the steel sheet, and a nickel layer formed an the iron-nickel diffusion layer and constituting the outermost surface layer, wherein when the Fe intensity and the Ni intensity are continuously measured along the depth direction from the surface of the surface-treated steel sheet for a battery container, by using a high frequency glow discharge optical emission spectrometric analyzer, the thickness of the iron-nickel diffusion layer, being the difference (D2−D1) between the depth (D1) at which the Fe intensity exhibits a first predetermined value and the depth (D2) at which the Ni intensity exhibits a second predetermined value, is 0.04 to 0.31 μm, and the total amount of nickel contained in the iron-nickel diffusion layer and the nickel layer is 4.4 g/m² or more and less than 10.8 g/m². It is to be noted that the depth (D1) exhibiting the first predetermined value is the depth exhibiting an intensity of 10% of the saturated value of the Fe intensity measured by the above-described measurement, and the depth (D2) exhibiting the second predetermined value is the depth exhibiting an intensity of 10% of the maximum value when the measurement is further performed along the depth direction after the Ni intensity shows the maximum value by the above-described measurement.

In the surface-treated steel sheet for a battery container of the present invention, the average crystal grain size in the surface portion of the nickel layer is preferably 0.2 to 0.6 μm.

In the surface-treated steel sheet for a battery container of the present invention, the thickness of the nickel layer is preferably 0.4 to 1.2 μm.

In the surface-treated steel sheet for a battery container of the present invention, the Vickers hardness (HV) of the nickel layer measured with a load of 10 gf is preferably 200 to 280.

According to the present invention, there is provided a battery container made of the above-described surface-treated steel sheet for a battery container.

According to the present invention, there is also provided a battery provided with the above-described battery container.

Moreover, according to the present invention, there is provided a method for producing a surface-treated steel sheet for a battery container, including:

a nickel plating step of forming a nickel plating layer on a steel sheet with a nickel amount of 4.4 g/m² or more and less than 10.8 g/m²; and a heat treatment step of applying a heat treatment to the steel sheet having the nickel plating layer formed thereon by maintaining the steel sheet at a temperature of 450 to 600° C. for 30 seconds to 2 minutes to thereby form an iron-nickel diffusion layer having a thickness of 0.04 to 0.31 μm.

Effect of Invention

According to the present invention, it is possible to provide a surface-treated steel sheet for a battery container excellent in corrosion resistance even when the volume percentage is improved by reducing the thickness of the can wall when a battery container is made of the surface-treated steel sheet for a battery container. Moreover, according to the present invention, it is possible to provide a battery container and a battery obtained by using such a surface-treated steel sheet for a battery container.

DESCRIPTION OF EMBODIMENTS

Hereinafter, one Embodiment of the present invention is described by way of the accompanying drawings. The surface-treated steel sheet for a battery container according to the present invention is processed into an external shape corresponding to the desired shape of a battery. Examples of a battery may include, without being particularly limited to: primary batteries such as an alkaline battery, and secondary batteries such as a nickel-hydrogen battery and a lithium-ion battery; as the members of the battery containers of these batteries, the surface-treated steel sheet for a battery container according to the present invention can be used. Hereinafter, the present invention is described on the basis of an embodiment using the surface-treated steel sheet for a battery container according to the present invention for a positive electrode can constituting the battery container of an alkaline battery.

Figure 1:
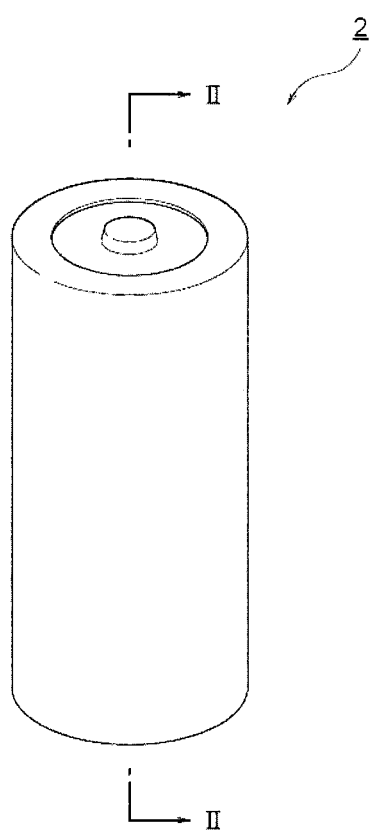
FIG. 1 is an oblique perspective view showing one embodiment of a battery undergoing an application of the surface-treated steel sheet for a battery container according to the present invention.
Figure 2:
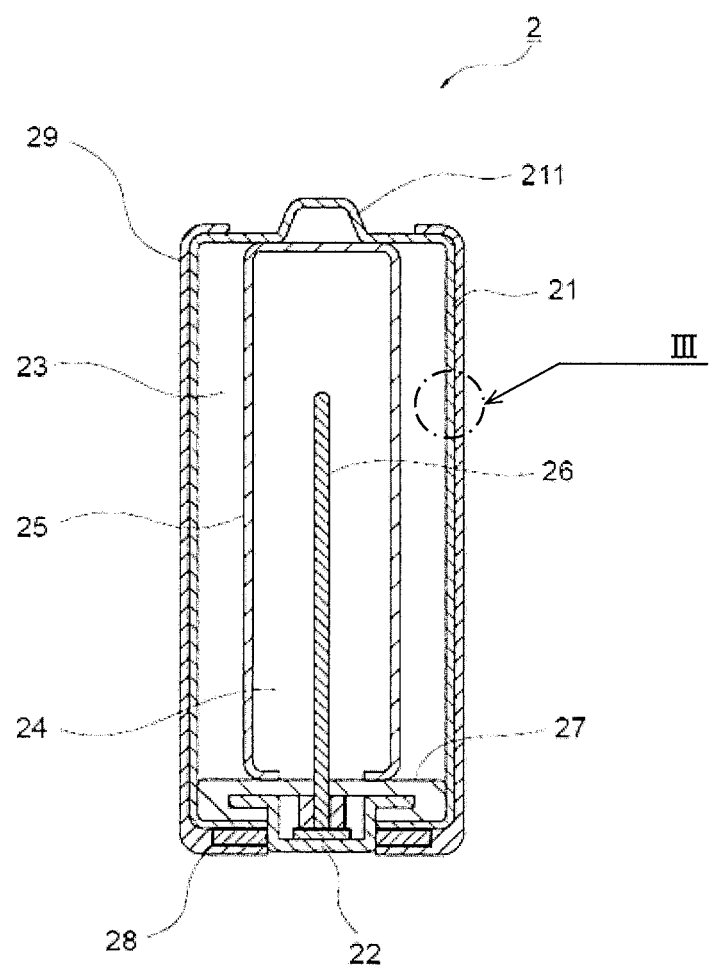
FIG. 2 is a cross-sectional view along the line II-II in FIG. 1.

FIG. 1 is an oblique perspective view showing one embodiment of an alkaline battery 2 undergoing an application of the surface-treated steel sheet for a battery container according to the present invention, and FIG. 2 is a cross-sectional view along the line II-II in FIG. 1. The alkaline battery 2 of the present example includes a positive electrode mixture 23 and a negative electrode mixture 24 filled inside the positive electrode can 21 having a bottomed cylindrical shape through the intermediary of a separator 25; and a sealing body constituted with a negative electrode terminal 22, a current collector 26 and a gasket 27 caulked on the inner surface side of the opening section of the positive electrode can 21. A convex positive electrode terminal 211 is formed in the bottom center of the positive electrode can 21. In addition, an exterior case 29 is mounted on the positive electrode can 21 through the intermediary of an insulating ring 28, for the purpose of imparting insulation properties, improving the design, and the like.

The positive electrode can 21 of the alkaline battery 2 shown in FIG. 1 is obtained by mold-processing the surface-treated steel sheet for a battery container according to the present invention, by applying, for example, a deep drawing processing method, a drawing and ironing processing method (DI processing method), a drawing thin and redrawing processing method (DTR processing method), or a processing method using a stretch processing and an ironing processing after a drawing processing. Hereinafter, with reference to FIG. 3, the constitution of the surface-treated steel sheet for a battery container (surface-treated steel sheet 1) according to the present invention is described.

Figure 3:
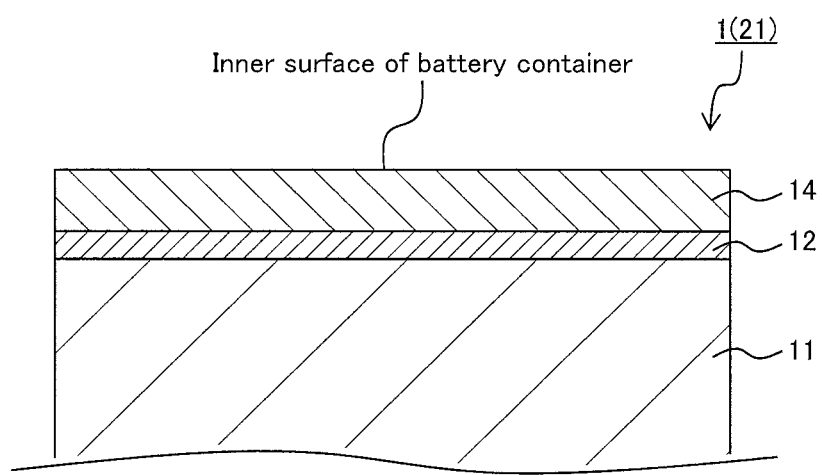
FIG. 3 is an enlarged cross-sectional view of the portion III in FIG. 2, in one embodiment of the surface-treated steel sheet for a battery container of the present invention.

FIG. 3 is an enlarged cross-sectional view of the portion III of the positive electrode can 21 shown in FIG. 2, and the upper side in FIG. 3 corresponds to the inner surface (the surface in contact with the positive electrode mixture 23 of the alkaline battery 2) of the alkaline battery 2 of FIG. 1. The surface-treated steel sheet 1 of the present embodiment includes, as shown in FIG. 3, an iron-nickel diffusion layer 12 and a nickel layer 14 formed on a steel sheet 11 constituting the substrate of the surface-treated steel sheet 1.

In the surface-treated steel sheet 1 of the present embodiment, the thickness of the iron-nickel diffusion layer 12 measured by a high frequency glow discharge optical emission spectrometric analyzer is 0.04 to 0.31 μm, and the total amount of the nickel contained in the iron-nickel diffusion layer 12 and the nickel layer 14 is 4.4 g/m$^2$ or more and less than 10.8 g/m$^2$. Herewith, the surface-treated steel sheet 1 of the present embodiment is excellent in corrosion resistance even in the case where the thickness of the can wall is reduced to improve the volume percentage when the surface-treated steel sheet 1 is processed into a battery container.

In addition, in the present embodiment, the average crystal grain size in the surface portion of the nickel layer 14 is preferably 0.2 to 0.6 μm. Herewith, the surface-treated steel sheet 1 of the present embodiment comes to be more excellent in the corrosion resistance when used as a battery container.

<Steel Sheet 11>

The steel sheet 11 of the present embodiment is not particularly limited as long as the steel sheet 11 is excellent in molding processability; for example, a low carbon aluminum-killed steel (carbon content: 0.01 to 0.15% by weight), a low carbon steel having a carbon content of 0.003% by weight or less, or a non-aging low carbon steel prepared by adding Ti, Nb or the like to a low carbon steel can be used. The thickness of the steel sheet is not particularly limited, but is preferably 0.2 to 0.5 mm. When the steel sheet is too thick, the heat quantity necessary for diffusion is deficient, and the diffusion layer is liable to be formed insufficiently. When the steel sheet is too thin, the thickness necessary as the subsequent battery sometimes cannot be secured, or the heat conduction is fast and the control of the thickness of the diffusion layer is liable to be difficult.

In the present embodiment, the hot rolled sheets of these steels are washed with an acid to remove the scales (oxide film), then cold rolled, then electrolytically washed, then annealed and subjected to temper rolling, and are used as the steel sheets 11; or alternatively, the hot rolled sheets of these steels washed with an acid to remove the scales (oxide film), then cold rolled, then electrolytically washed, then subjected to temper rolling without being subjected to annealing, and are used as the steel sheets 11.

<Iron-Nickel Diffusion Layer 12, and Nickel Layer 14>

In the surface-treated steel sheet 1 of the present embodiment, the iron-nickel diffusion layer 12 is a layer allowing iron and nickel to mutually diffuse therein, formed as a result of a thermal diffusion treatment performed after the nickel plating layer 13 is formed on the steel sheet 11, so as to cause the thermal diffusion of the iron constituting the steel sheet 11 and the nickel constituting the nickel plating layer 13. The nickel layer 14 is a layer derived from the portion free from the diffusion of iron in the vicinity of the surface layer of the nickel plating layer 13, the portion being thermally recrystallized and softened when the thermal diffusion treatment is performed.

By forming the iron-nickel diffusion layer 12 obtained by such a thermal diffusion treatment, when the surface-treated steel sheet 1 is used as a battery container, the direct, wide area contact of the steel sheet with the electrolytic solution or the like constituting the battery can be prevented; and moreover, the presence of the iron-nickel diffusion layer 12 relaxing the potential difference between the nickel of the nickel layer 14 and the iron of the steel sheet 11 allows the corrosion resistance and the battery properties to be satisfactory. The formation of the iron-nickel diffusion layer 12 also allows the adhesiveness between the steel sheet 11 and the nickel layer 14 to be improved.

The nickel plating layer 13 for forming the iron-nickel diffusion layer 12 can be formed an the steel sheet 11 by using, for example, a nickel plating bath. As the nickel plating bath, there can be used a plating bath usually used in nickel plating, namely, a Watts bath, a sulfamate bath, a boron fluoride bath, a chloride bath and the like. For example, the nickel plating layer 13 can be formed by using, as a watts bath, a bath having a bath composition containing nickel sulfate in a concentration of 200 to 350 g/L, nickel chloride in a concentration of 20 to 60 g/L, and boric acid in a concentration of 10 to 50 g/L, under the conditions that the pH is 3.0 to 4.8 (preferably pH is 3.6 to 4.6), the bath temperature is 50 to 70° C., the current density is 10 to 40 A/dm$^2$ (preferably 20 to 30 A/dm$^2$).

It is to be noted that as the nickel plating layer, a sulfur-containing bright plating is not preferable because the battery properties are liable to be degraded; however, it is possible in the present invention to apply a matte plating not containing sulfur in an amount equal to or more than the amount of an inevitable impurity as well as a semi-gloss plating. This is because the hardness of the layer obtained by plating is as follows: the semi-gloss plating is harder than the matte plating, but the heat treatment for forming the diffusion layer in the present invention allows the hardness of the semi-gloss plating to be comparable with or slightly higher than the hardness of the matte plating. When a semi-gloss plating is formed as a nickel plating layer, a semi-gloss agent may be added to the above-described plating baths. The semi-gloss agent is not particularly limited as long as the semi-gloss agent allows the nickel plating layer after plating to be free from sulfur (for example, 0.05% or less in an fluorescent X-ray measurement); as the semi-glass agent, it is possible to use, for example, an aliphatic unsaturated alcohol such as a polyoxyethylene adduct of an unsaturated alcohol, an unsaturated carboxylic acid, formaldehyde, and coumarin.

Figure 4:
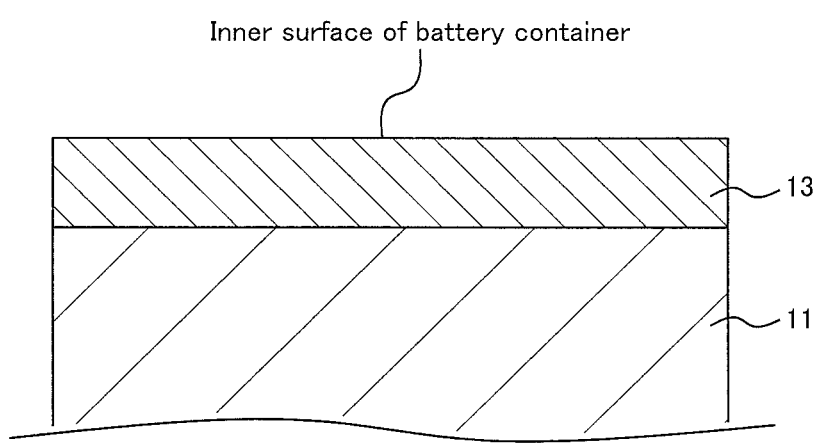
FIG. 4 is a diagram for illustrating the method for producing the surface-treated steel sheet for a battery container shown in FIG. 3.

In the present embodiment, as shown in FIG. 4, the above-described nickel plating layer 13 is formed on the steel sheet 11, and subsequently a thermal diffusion treatment is performed; thus, the iron-nickel diffusion layer 12 and the nickel layer 14 are formed, and the surface-treated steel sheet 1 as shown in FIG. 3 can be obtained.

In the present embodiment, the nickel amount in the nickel plating layer 13 before performing the thermal diffusion treatment corresponds to the total amount of the nickel contained in the iron-nickel diffusion layer 12 and the nickel contained in the nickel layer 14 obtained by the thermal diffusion treatment.

The total amount (the nickel amount in the nickel plating layer 13 before performing the thermal diffusion treatment) of the nickel contained in the iron-nickel diffusion layer 12 and the nickel contained in the nickel layer 14 obtained by the thermal diffusion treatment may be 4.4 g/m$^2$ or more and less than 10.8 g/m$^2$, is preferably 5.5 g/m$^2$ or more and less than 10.8 g/m$^2$, and is more preferably 6.5 g/m$^2$ or more and less than 10.8 g/m$^2$. When the total amount of the nickel contained in the iron-nickel diffusion layer 12 and the nickel contained in the nickel layer 14 is too small, the improvement effect of the corrosion resistance due to nickel is insufficient, and the corrosion resistance of the obtained surface-treated steel sheet 1 used as a battery container is degraded. On the other hand, when the total amount of the nickel contained in the iron-nickel diffusion layer 12 and the nickel contained in the nickel layer 14 is too large, the can wall thickness of the battery container made of the obtained surface-treated steel sheet 1 comes to be thick and the volume of the interior of the battery container comes to be small (the volume percentage is degraded). The total amount of the nickel contained in the iron-nickel diffusion layer 12 and the nickel contained in the nickel layer 14 can be determined by a method calculating on the basis of the total amount (total weight) of the nickel contained in the iron-nickel diffusion layer 12 and the nickel contained in the nickel layer 14 measurable with an ICP analysis method. Alternatively, the total amount of the nickel contained in the iron-nickel diffusion layer 12 and the nickel contained in the nickel layer 14, can also be determined by a method calculating on the basis of the measured deposition amount obtained by measuring the deposition amount of the nickel atoms constituting the nickel plating layer 13 by performing a fluorescent X-ray measurement after the formation of the nickel plating layer 13 and before performing the thermal diffusion treatment.

The conditions of the thermal diffusion treatment may be appropriately selected according to the thickness of the nickel plating layer 13; the heat treatment temperature is 450 to 600° C., more preferably 480 to 590° C., and further preferably 500 to 550° C.; the soaking time in the heat treatment is preferably 30 seconds to 2 minutes, more preferably 30 to 100 seconds, and further preferably 45 to 90 seconds. In addition, in the heat treatment, the time including the heating up time and the cooling time in addition to the soaking time is preferably 2 to 7 minutes and more preferably 3 to 5 minutes. The thermal diffusion treatment method is preferably a continuous annealing method from the viewpoint of easy regulation of the heat treatment temperature and the heat treatment time within the above-described ranges.

In the present invention, as described above, by performing the thermal diffusion treatment, the iron-nickel diffusion layer 12 can be formed between the steel sheet 11 and the nickel layer 14, and consequently the surface-treated steel sheet 1 is allowed to have a constitution (Ni/Fe-Ni/Fe) having the iron-nickel diffusion layer 12 and the nickel layer 14 on the steel sheet 11 in order from bottom to top.

In the present embodiment, the thickness of the thus formed iron-nickel diffusion layer 12 measured with a high frequency glow discharge optical emission spectrometric analyzer may be 0.04 to 0.31 Nm, and is preferably 0.05 to 0.27 μm, more preferably 0.08 to 0.25 n, and further preferably 0.09 to 0.20 μm. When the thickness of the iron-nickel diffusion layer 12 is too small, the adhesiveness of the nickel layer 14 in the surface-treated steel sheet 1 is liable to be degraded. On the other hand, when the thickness of the iron-nickel diffusion layer 12 is too large, the amount of exposed iron comes to be too large in the nickel layer 14 of the surface-treated steel sheet 1, and consequently, when the surface-treated steel sheet 1 is used as the battery container, the amount of iron dissolved from the inner surface of the battery container is large and the corrosion resistance is degraded.

It is to be noted that the thickness of the iron-nickel diffusion layer 12 can be determined by continuously measuring the variations of the Fe intensity and the Ni intensity in the depth direction from the outermost surface toward the steel sheet 11 with respect to the surface-treated steel sheet 1 by using a high frequency glow discharge optical emission spectrometric analyzer.

Figure 5:
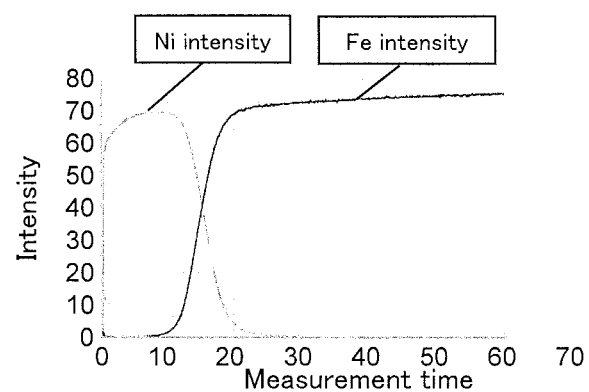
FIG. 5 presents the graphs showing the results of the Fe intensities and the Ni intensities of the surface-treated steel sheets for a battery container of Example and Cooperative Examples, measured by a high frequency glow discharge optical emission spectrometric analyzer.
Figure 5:
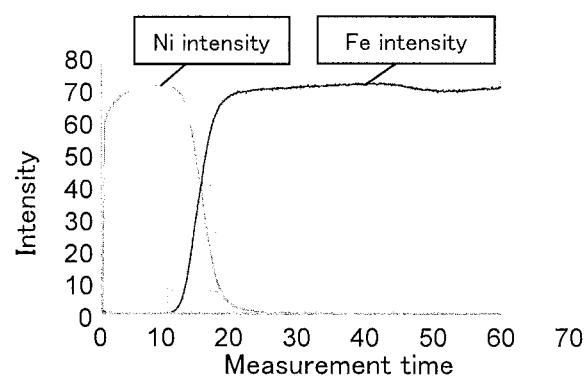
Figure 5:
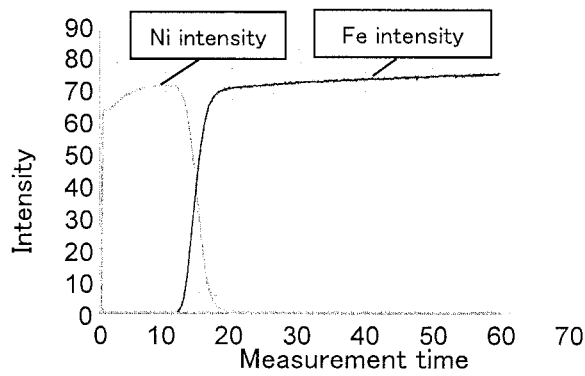
Figure 5:
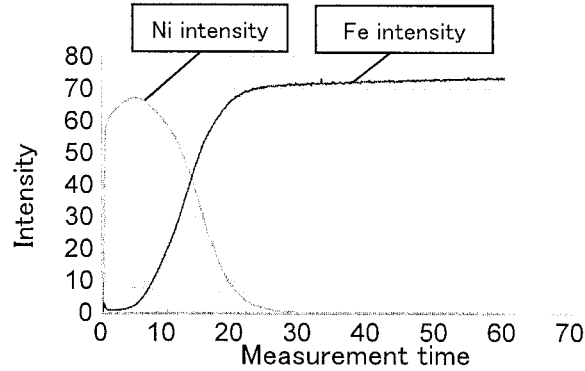

Specifically, first, by using the high frequency glow discharge optical emission spectrometric analyzer, the Fe intensity in the surface-treated steel sheet 1 is measured until the Fe intensity is saturated, and by adopting the saturated value of the Fe intensity as a reference, the depth giving the Fe intensity 10% of the saturated value is defined as the boundary between the nickel layer 14 and the iron-nickel diffusion layer 12. For example, the details are described with reference to FIG. 5(A) showing the measurement results of the surface-treated steel sheet 1 of a below-described Example. It is to be noted that, in FIG. 5(A), the ordinate represents the Fe intensity and the Ni intensity, and the abscissa represents the measurement time when the measurement is performed in the depth direction from the surface of the surface-treated steel sheet 1 by using a high frequency glow discharge optical emission spectrometric analyzer.

In the present embodiment, first, the saturated value of the Fe intensity is determined on the basis of the measurement results of the Fe intensity. The saturated value of the Fe intensity is determined from the time variation rate (Fe intensity variation/second) of the Fe intensity. The time variation rate of the Fe intensity comes to be steeply large when Fe is detected after the start of the measurement, and decreases after passing the maximum value and is stabilized in the vicinity of approximately zero. The value when the time variation rate is stabilized at approximately zero is the saturated value, and specifically, when the time variation rate of the Fe intensity comes to be 0.02 (Fe intensity variation/second) or less, the measurement time in the depth direction can be taken as the measurement time of the saturation of the Fe intensity.

In the example shown in FIG. 5(A), the saturated value of the Fe intensity is a value of approximately 70 in the vicinity of the measurement time of 20 seconds, and the depth giving an Fe intensity of approximately 7, 10% of the saturated value, can be detected as the boundary between the nickel layer 14 and the iron-nickel diffusion layer 12.

On the other hand, the boundary between the iron-nickel diffusion layer 12 and the steel sheet 11 can be detected as follows. Specifically, when the Ni intensity of the surface-treated steel sheet 1 is measured by using a high frequency glow discharge optical emission spectrometric analyzer, the maximum value is extracted from the obtained graph showing the variation of the Ni intensity, and the depth giving a Ni intensity of 10% of the maximum value after the maximum value has been shown is determined as the boundary between the iron-nickel diffusion layer 12 and the steel sheet 11. For example, with reference to FIG. 5(A), the maximum value of the Ni intensity is a value of approximately 70 at the measurement time in the vicinity of 9 seconds, and accordingly, the depth giving a Ni intensity of approximately 7, 10% of the maximum value of the Ni intensity, can be detected as the boundary between the nickel plating layer 13 and the steel sheet 11.

In addition, in the present embodiment, on the basis of the boundaries between the layers determined as described above, it is possible to determine the thickness of the iron-nickel diffusion layer 12. Specifically, when the measurement is performed by using a high frequency glow discharge optical emission spectrometric analyzer, the time giving an Fe intensity of 10% of the saturated value of the Fe intensity is set as the starting point, the measurement time until the time giving a Ni intensity of 10% of the maximum value after the Ni intensity has exhibited the maximum value is calculated, and on the basis of the calculated measurement time, the thickness of the iron-nickel diffusion layer 12 can be determined.

It is to be noted that for the purpose of determining the thickness of the iron-nickel diffusion layer 12 of the surface-treated steel sheet 1 on the basis of the measurement time, the high frequency glow discharge optical emission spectrometric analysis of the nickel-plated steel sheet having a known thickness and having undergone no thermal diffusion treatment is performed, the depth thickness calculated as the iron-nickel diffusion layer seen in the measurement graph (for example, FIG. 5(C) showing the measurement results of below-described Comparative Example 1) is required to be subtracted at the time of calculation of the iron-nickel diffusion layer 12 of the surface-treated steel sheet 1 as the actual measurement object. Specifically, from the thickness of the iron-nickel diffusion layer 12 portion (the thickness value obtained in FIG. 5(A) as follows: the time giving the Fe intensity of 10% of the saturated value of the Fe intensity is taken as the starting point, the measurement time until the time giving the Ni intensity an intensity of 10% of the maximum value of the Ni intensity after the Ni intensity has exhibited the maximum value thereof is converted into the thickness) calculated from the graph of FIG. 5(A), the thickness calculated in the same manner from the graph of FIG. 5(B) is subtracted, and thus, the thickness of the actual iron-nickel diffusion layer 12 in the graph of FIG. 5(A) can be determined.

In the present invention, as described above, for the nickel-plated steel sheet having a known plating thickness and having undergone no heat treatment, a high frequency glow discharge optical emission spectrometric analysis is performed, the thickness calculated as an iron-nickel diffusion layer is taken as the "reference thickness," and the difference (D2−D1) between D1 and D2 indicates the value obtained by subtracting the reference thickness.

It is to be noted that in the measurement with a high frequency glow discharge optical emission spectrometric analyzer, with the increase of the thickness of the nickel plating layer, the reference thickness calculated from the measurement of the nickel plating layer comes to be increased; thus, when the thickness of the iron-nickel diffusion layer is determined, the reference thickness is checked in the plating deposition amount of each of the layers, or alternatively, it is desirable that the measurement of the reference thickness is performed in each of the two or more samples, different from each other in the plating deposition amount before performing heat treatment, the relation formula between the plating deposition amount and the reference thickness is determined, and then the thickness of the iron-nickel diffusion layer is calculated.

In addition, by measuring the nickel-plated steel sheet undergoing no thermal diffusion treatment, the relation between the depth time (the measurement time based on a high frequency glow discharge optical emission spectrometric analyzer) and the actual thickness can be determined, and accordingly, by utilizing this numerical value (the numerical value showing the relation between the depth time and the actual thickness), it is possible to convert the depth times into the thickness of the iron-nickel diffusion layer 12 and the thickness of the nickel layer 14 of the surface-treated steel sheet 1, to be an actual measurement object.

It is to be noted that when the thickness of the iron-nickel diffusion layer 12 is measured as described above with a high frequency glow discharge optical emission spectrometric analyzer, sometimes there is a detection limit value of the thickness of the iron-nickel diffusion layer 12, due to the performances of the high frequency glow discharge optical emission spectrometric analyzer, the measurement conditions or the like. For example, when a heat-treated nickel-plated steel sheet 1 prepared by using, as the steel sheet 11, a steel sheet having a surface roughness Ra of 0.05 to 3 µm, as measured with a stylus-type roughness meter, is measured with a measurement diameter of ϕ5 mm of a high frequency glow discharge optical emission spectrometric analyzer, the detectable region (detection limit value with respect to shape) is approximately 0.04 µm; when the thickness of the iron-nickel diffusion layer 12 measured with the high frequency glow discharge optical emission spectrometric analyzer is equal to or less than the detection limit value, the thickness of the iron-nickel diffusion layer 12 can be regarded to be more than 0 µm and less than 0.04 µm. In other words, in the case where the nickel plating layer 13 is formed on the steel sheet 11, and subsequently the iron-nickel diffusion layer 12 and the nickel layer 14 are formed by performing a thermal diffusion treatment, even when the thickness of the iron-nickel diffusion layer 12 is equal to or less than the detection limit value in the measurement of the thickness of the iron-nickel diffusion layer 12 by using the high frequency glow discharge optical emission spectrometric analyzer, the thickness of the iron-nickel diffusion layer 12 can be regarded to be more than 0 µm and less than 0.04 µm. It is to be noted that when the nickel plating layer 13 is formed on the steel sheet 11, and then a nickel-plated steel sheet is obtained by applying no thermal diffusion treatment, the iron-nickel diffusion layer 12 can be regarded not to be formed in the nickel-plated steel sheet (the thickness of the iron-nickel diffusion layer 12 is 0).

The thickness of the iron-nickel diffusion layer 12 is increased with the increase of the heat treatment temperature, or with the increase of the heat treatment time which allows the mutual diffusion of iron and nickel to proceed easily. Because iron and nickel mutually diffuse, the formed iron-nickel diffusion layer 12 extends on the side of the steel sheet 11 and also diffuses on the side of the nickel plating layer 13, in relation to the interface between the steel sheet 11 and the nickel plating layer 13 before the diffusion. When the heat treatment temperature is set to be too high, or the heat treatment time is set to be too long, the iron-nickel diffusion layer 12 comes to be thick, and the nickel layer 14 canes to be thin. For example, the thickness of the iron-nickel diffusion layer 12 comes to be more than 0.3 µm. The present inventors have discovered that when such a surface-treated steel sheet is molded into a battery container, there occurs an increase of the dissolution amount probably caused by the increase of the exposure of iron. The causes for the exposure of iron on the inner surface of the battery container are probably the exposure of a large amount of iron on the inner surface of the battery container and the appearance of local iron exposure portions, not only in the case where the thickness of the nickel layer 14 nearly vanishes and iron reaches the surface layer in the surface-treated steel sheet 1, but also in the case where iron does not reach the surface layer in the state of the surface-treated steel sheet 1. In this case, when the surface-treated steel sheet 1 is stored or used as a battery container over a long term, there is an adverse possibility that iron is dissolved from the local iron exposure portions into the electrolytic solution, and the gas generated due to the dissolution of iron increases the internal pressure of the interior of the battery.

In particular, the present inventors have discovered that the corrosion resistance is liable to be more degraded, in the case where the nickel plating layer is made thin for the purpose of achieving a high battery capacity, or in the case where a processing is performed to make the thickness of the can wall after forming a battery can thinner than the thickness of the surface-treated steel sheet before forming the battery can; the present inventors have revealed that the surface-treated steel sheet 1 of the present embodiment exhibits a marked corrosion resistance even under such severe processing conditions. Moreover, for the purpose of achieving a high battery capacity, it is possible to make thin the thickness of the nickel plating layer and to make thin the thickness of the can wall; however, either of these approaches offers a factor to degrade the corrosion resistance of the battery container. The present inventors have found a new problem of the compatibility of these approaches for achieving a high capacity and the corrosion resistance improvement with respect to the conventional surface-treated steel sheets, and have found a new constitution capable of coping with the achievement of a high capacity.

In the present embodiment, as described above, with respect to the surface-treated steel sheet 1, by controlling the total amount of the nickel contained in the iron-nickel diffusion layer and the nickel contained in the nickel layer so as to fall within a comparatively small range of 4.4 g/m² or more and less than 10.8 g/m², the thickness of the can wall can be made thin when the surface-treated steel sheet 1 is formed into a battery container, and accordingly the volume percentage of the obtained battery can be remarkably improved. Moreover, according to the surface-treated steel sheet 1 of the present embodiment, by setting the thickness of the iron-nickel diffusion layer 12 to be 0.04 to 0.31 µm, even when the thickness of the can wall is made thin to improve the volume percentage as described above in the case where the surface-treated steel sheet 1 is formed into a battery container, the battery container can be made excellent in corrosion resistance. It is to be noted that when thickness of the can wall of a battery container is made thin, the amount of iron dissolved on the inner surface of the battery container sometimes has hitherto come to be large, and consequently the corrosion resistance of the inner surface of the battery container is sometimes degraded. On the other hand, as a method for improving the corrosion resistance when formed into a battery container, there is a method to make thick the thickness of the iron-nickel diffusion layer and the thickness of the nickel layer formed on the inner surface of the battery container; however, in this case, there is a problem that the thickness of the can wall comes to be thick when formed into a battery container, and consequently the volume percentage is degraded. Accordingly, in the technique for the surface-treated steel sheet for a battery container, it has been difficult to allow the volume percentage and the corrosion resistance to be compatible with each other when formed into a battery container. In contrast, according to the present embodiment, by controlling the thickness of the iron-nickel diffusion layer 12 and the above-described total amount of the nickel contained in the iron-nickel diffusion layer 12 and the nickel contained in the nickel layer 14 so as to fall within the above-described ranges, respectively, it is possible to provide a surface-treated steel sheet 1 being highly balanced between the volume percentage and the corrosion resistance when formed into a battery container.

In addition, there has hitherto been known a method in which the thickness of the iron-nickel diffusion layer is set to be 0.5 µm or more, in the surface-treated steel sheet having a nickel plating layer and an iron-nickel diffusion layer, for example, from the viewpoint of improving the processability when molded as a battery container, from the viewpoint of improving the corrosion resistance of the battery container, and from the viewpoint of securing the adhesiveness of the iron-nickel diffusion layer (see, for example, the paragraph 0018 in Japanese Patent Laid-Open No. 2009-263727). Herein, in order to set the thickness of the iron-nickel diffusion layer to be 0.5 µm or more, the condition of the thermal diffusion treatment after the formation of the nickel plating layer on the steel sheet is required to be a long time or a high temperature. For example, when the condition of the thermal diffusion treatment is set to be a long time, there have been known the conditions that the heat treatment temperature is set to be 400 to 600° C., and the heat treatment time is set to be 1 to 8 hours. In addition, when the condition of the thermal diffusion treatment is set to be a high temperature, there have been known the conditions that the heat treatment temperature is set to be 700 to 800° C., and the heat treatment time is set to be 30 seconds to 2 minutes. Under such circumstances, the present inventors have obtained a finding that when the thermal diffusion treatment is performed under the above-described condition of a long time or a high temperature, the iron of the steel sheet constituting the surface-treated steel sheet is thermally diffused to an excessive extent, and when the obtained surface-treated steel sheet is molded into a battery container, the amount of iron dissolved is increased; and accordingly, as described above, the present inventors have discovered that gas is generated in the interior of the battery, and the internal pressure of the interior of the battery is liable to be increased due to the generation of the gas. In addition, when the thermal diffusion treatment is performed at a heat treatment temperature of 700 to 800° C. and at a heat treatment time of 30 seconds to 2 minutes, there is a problem that the hardness of the nickel layer 14 is decreased excessively, and consequently the sticking to the mold occurs to a large extent.

In contrast, according to the present embodiment, with respect to the surface-treated steel sheet 1, by setting the thickness of the iron-nickel diffusion layer 12 to be 0.04 to 0.31 µm, and by controlling the total amount of the nickel contained in the iron-nickel diffusion layer and the nickel contained in the nickel layer so as to fall within a range of 4.4 g/m² or more and less than 10.8 g/m², the exposure area of the iron of the steel sheet is reduced on the inner surface side when the steel sheet surface-treated steel sheet 1 is molded into a battery container, it is made possible to improve the corrosion resistance when the surface-treated steel sheet 1 is used as a battery container, and in addition, it is made possible to more improve the processability when the surface-treated steel sheet 1 is processed into a battery container.

In addition, in the present embodiment, the thickness of the nickel layer 14 after the thermal diffusion treatment is preferably 0.5 to 1.20 µm, more preferably 0.60 to 1.20 µm, and further preferably 0.70 to 1.17 µm. By controlling the thickness of the nickel layer 14 after the thermal diffusion treatment so as to fall within such a comparatively thin range as described above, while the corrosion resistance improvement effect due to the iron-nickel diffusion layer 12 is being sufficiently secured, it is possible to make thin the wall thickness when molded into a battery container, and thus, it is possible to increase the volume inside the battery container. Herewith, the amounts of the contents such as the positive electrode mixture 23 and the negative electrode mixture 24 to be packed in the battery container can be increased, and the battery properties of the obtained battery can be improved. The thickness of the nickel layer 14 after the thermal diffusion treatment can be determined by detecting the boundary between the nickel layer 14 and the iron-nickel diffusion layer 12, on the basis of the measurement using the above-described high frequency glow discharge optical emission spectrometric analyzer. In other words, the time at which the measurement of the surface of the surface-treated steel sheet 1 is started by using the high frequency glow discharge optical emission spectrometric analyzer is taken as the starting point, the measurement time until the time giving the Fe intensity of 10% of the saturated value of the Fe intensity is calculated, and on the basis of the calculated measurement time, the thickness of the nickel layer 14 can be determined.

In addition, in the present embodiment, in the nickel layer 14 after the thermal diffusion treatment, the average crystal grain size in the surface portion thereof is preferably 0.2 to 0.6 µm, more preferably 0.3 to 0.6 µm, and further preferably 0.3 to 0.5 µm. In the present embodiment, the average crystal grain size in the surface portion of the nickel layer 14 is not particularly limited; when the average crystal grain size is too small, the plating stress remains accumulated, and in this case, when mold-processed as a battery container, a deep crack reaching the steel sheet occurs in the surface-treated steel sheet 1, and thus, the iron of the steel sheet 11 is sometimes exposed. In this case, iron is dissolved from the exposed portion of the steel sheet 11, and there is an adverse possibility that the gas generated along with the dissolution of iron increases the internal pressure of the interior of the battery. On the other hand, as described above, failures occur when the cracks reaching the steel sheet 11 are generated in the surface-treated steel sheet 1; however, from the viewpoint of improving the battery properties of the battery container, it is preferable for fine cracks to occur on the inner surface side of the battery container formed of the surface-treated steel sheet 1. In this regard, when the average crystal grain size in the surface portion of the nickel layer 14 is too large, the hardness of the nickel layer 14 sometimes comes to be too low (the nickel layer 14 is softened excessively); in this case, when the surface-treated steel sheet 1 is mold-processed as a battery container, fine cracks cannot be generated on the inner surface of the battery container, and accordingly, there is an adverse possibility that the following effect is not sufficiently obtained: the effect of improving the battery properties, namely, the effect of improving the battery properties by increasing the contact area between the battery container and the positive electrode mixture owing to the cracks and thereby decreasing the internal resistance of the battery.

According to the present embodiment, with respect to the surface-treated steel sheet 1, even in the case where the thickness of the nickel plating layer 13 is set to be comparatively thin, by setting the thickness of the iron-nickel diffusion layer 12 to be comparatively as thin as 0.04 to 0.31 µm, the exposure area of the iron of the steel sheet is suppressed on the inner surface side when the steel sheet surface-treated steel sheet 1 is molded into a battery container, and thus, it is made possible to improve the corrosion resistance when the surface-treated steel sheet 1 is used as a battery container. In addition, according to the present embodiment, by controlling the average crystal grain size in the surface portion of the nickel layer 14 so as to be 0.2 to 0.6 µm, it is made possible to more improve the processability when the surface-treated steel sheet 1 is processed into a battery container. Moreover, according to the present embodiment, the thickness of the iron-nickel diffusion layer 12 and the thickness of the nickel layer 14 are set to be comparatively thin, accordingly, it is advantageous in terms of cost to produce the surface-treated steel sheet 1, it is made possible to increase the internal volume of the battery container when the surface-treated steel sheet 1 is molded into a battery container and a battery is assembled, and thus the improvement of the battery properties is resulted.

It is to be noted that the average crystal grain size in the surface portion of the nickel layer 14 tends to be larger with the increase of the heat treatment temperature in the thermal diffusion treatment, and the present inventors have discovered that the magnitude of the average crystal grain size increases in a stepwise manner depending on the temperature range. The crystal grains are larger in the case where heat treatment is applied even at a low temperature such as 300° C., as compared with the case where no heat treatment is applied. When the heat treatment temperature is set to be between 400 and 600° C., the crystal grain size increases with the increase of the temperature, but the difference of the magnitude of the crystal grain size due to the temperature is moderate. When the heat treatment temperature exceeds 700° C., the average crystal grain size steeply increases. Accordingly, by controlling the heat treatment temperature of the thermal diffusion treatment, it is possible to regulate the average crystal grain size in the surface portion of the nickel layer 14. In particular, by suppressing the coarsening of the average crystal grain size and allowing the surface hardness of the nickel layer 14 to be hard, it is made possible to aim at the improvement of the battery properties and the suppression effect of the sticking of the nickel layer 14 to the mold during the processing into the battery container, and accordingly the heat treatment temperature is particularly preferably 430 to 550° C. In other words, by allowing the surface hardness of the nickel layer 14 to be hard by setting the heat treatment temperature so as to fall within the above described range, it is made possible to generate fine cracks not reaching the steel sheet 11, on the inner surface of the battery container made of the surface-treated steel sheet 1 when the surface-treated steel sheet 1 is mold-processed into a battery container, the cracks increases the contact area between the battery container and the positive electrode mixture and decreases the internal resistance of the battery, and thus the battery properties can be further improved.

In the present embodiment, the average crystal grain size in the surface portion of the nickel layer 14 can be determined, for example, by using the backscattered electron image obtained by measuring the surface of the surface-treated steel sheet 1 with a scanning electron microscope (SEM).

Specifically, first, the surface of the surface-treated steel sheet 1 is etched if necessary, then the surface of the surface-treated steel sheet 1 is measured with a scanning electron microscope (SEM), as shown in FIG. 7(A). It is to be noted that FIG. 7(A) is an image showing the backscattered electron image obtained by measuring the surface-treated steel sheet 1 of below-described Example, at an magnification of 10,000. Then, on the obtained backscattered electron image, an optional number of straight line segments of 10 µm in length are drawn (four lines, for example). Then, in each of the line segments, on the basis of the number n of the crystal grains located on the straight line segment, the crystal grain size d is determined by using the formula $d=10/(n+1)$, and the average value of the crystal grain sizes d obtained for the respective straight line segments can be taken as the average crystal grain size in the surface portion of the nickel plating layer 13.

In addition, in the present embodiment, the surface hardness of the nickel layer 14 after the thermal diffusion treatment is preferably 200 to 280, and more preferably 210 to 250, in terms of the Vickers hardness (HV) measured with a load of 10 gf. By setting the surface hardness of the nickel layer 14 after the thermal diffusion treatment so as to fall within the above-described range, the processability is improved when the obtained surface-treated steel sheet 1 is processed into a battery container, and the corrosion resistance is improved when the surface-treated steel sheet 1 is used for the battery container.

In the present embodiment, with respect to the surface-treated steel sheet 1, as a method for controlling the thickness of the iron-nickel diffusion layer 12 and the total amount of the nickel contained are controlled in the iron-nickel diffusion layer and the nickel contained in the nickel layer so as to fall within the above-described ranges, respectively, a method for performing the thermal diffusion treatment under the above-described conditions may be mentioned. Specifically, there may be mentioned a method in which after the nickel plating layer 13 is formed on the steel sheet 11, a thermal diffusion treatment is performed under the conditions that the heat treatment temperature is 450 to 600° C., and the heat treatment time is 30 seconds to 2 minutes.

In addition, in the present embodiment, with respect to the obtained surface-treated steel sheet 1, also as the method for controlling the average crystal grain size in the surface portion of the nickel layer 14 so as to fall within the above-described range, a method of performing a thermal diffusion treatment under the same conditions as described above may be mentioned. Specifically, there may be mentioned a method in which after the nickel plating layer 13 is formed on the steel sheet 11, a thermal diffusion treatment is performed under the conditions that the heat treatment temperature is 450 to 600° C., and the heat treatment time is 30 seconds to 2 minutes.

It is to be noted that the thickness of the iron-nickel diffusion layer 12 tends to be thick, with the increase of the heat treatment temperature, and with the increase of the heat treatment time. Accordingly, by controlling the heat treatment temperature and the heat treatment time of the thermal diffusion treatment, it is possible to regulate the thickness of the iron-nickel diffusion layer 12 and the ratio of (thickness of iron-nickel diffusion layer 12/thickness of nickel layer 14). However, because it is difficult to form an iron-nickel diffusion layer at 300° C., from the viewpoint of controlling the thickness of the iron-nickel diffusion layer 12, and the ratio of (thickness of iron-nickel diffusion layer 12/thickness of nickel layer 14) so as to fall within the above-described ranges, it is preferable to perform a thermal diffusion treatment at 480° C. or higher.

The surface-treated steel sheet 1 of the present embodiment is constituted as described above.

The surface-treated steel sheet 1 of the present embodiment is used as mold-processed into the positive electrode can 21 of an alkaline battery 2 shown in FIGS. 1 and 2, battery containers of other batteries and the like, by using, for example, a deep drawing processing method, a drawing and ironing processing method (DI processing method), a drawing thin and redrawing processing method (DTR processing method), or a processing method using a stretch processing and an ironing processing in combination after a drawing processing.

<Method for Producing Surface-Treated Steel Sheet 1>

Next, a method for producing the surface-treated steel sheet 1 of the present embodiment is described.

First, the steel sheet 11 is prepared, and as described above, a nickel plating is applied to the steel sheet 11, to form the nickel plating layer 13 on the surface of the steel sheet 11, to be the inner surface of a battery container. It is to be noted that the nickel plating layer 13 is preferably formed not only on the surface of the steel sheet 11 to be the inner surface of the battery container but also on the opposite surface. When the nickel plating layer 13 is formed on both surfaces of the steel sheet 11, the nickel plating layers 13 different from each other in the composition and the surface roughness may be formed on the surface in the steel sheet 11 to be the inner surface of the battery container and on the surface of the steel sheet 11 to be the outer surface of the battery container, respectively, by using plating baths having different compositions; however, from the viewpoint of improving the production efficiency, it is preferable to form the nickel plating layers 13 on both surfaces of the steel sheet 11, by using the same plating bath in one step.

Next, by performing the thermal diffusion treatment under the above-described conditions for the steel sheet 11 having the nickel plating layer 13 formed thereon, the iron constituting the steel sheet 11 and the nickel constituting the nickel plating layer 13 are allowed to thermally diffuse, to from the iron-nickel diffusion layer 12 and the nickel layer 14. Herewith, the surface-treated steel sheet 1 as shown in FIG. 3 is obtained.

It is to be noted that in the present embodiment, a temper rolling may be applied to the obtained surface-treated steel sheet 1. Herewith, it is possible to regulate the surface roughness of the surface of the surface-treated steel sheet 1 to be the inner surface of the battery container; when the surface-treated steel sheet 1 is used as a battery container, the contact area between the battery container and the positive electrode mixture can be increased, the internal resistance of the battery can be decreased, and the battery properties can be improved.

As described above, the surface-treated steel sheet 1 of the present embodiment is produced.

In the surface-treated steel sheet 1 of the present embodiment, as described above, by controlling the total amount of the nickel contained in the iron-nickel diffusion layer and the nickel contained in the nickel layer so as to fall within a comparatively small range of 4.4 g/m$^2$ or more and less than 10.8 g/m$^2$, and by setting the thickness of the iron-nickel diffusion layer 12 measured with a high frequency glow discharge optical emission spectrometric analyzer so as to fall within a comparatively thin range of 0.04 to 0.31 μm, with respect to the obtained alkaline battery 2, while the volume percentage is being remarkably improved by making thin the thickness of the can wall of the battery container, further it is possible to suppress the iron exposure area of the steel sheet on the inner surface side of the battery container and to improve corrosion resistance of the battery container. In addition, as described above, by setting the average crystal grain size in the surface portion of the nickel layer 14 so as to be preferably 0.2 to 0.6 μm, the hardness of the nickel layer 14 can be made appropriate, and herewith, the following excellent effect is obtained: when the surface-treated steel sheet 1 is mold-processed into a battery container, while the exposure of iron due to deep cracks generated in the surface-treated steel sheet 1 is being effectively suppressed, fine cracks are generated on the inner surface of the battery container, and consequently the battery properties are more effectively improved. Moreover, as described above, by setting the thickness of the nickel layer 14 to be preferably 0.5 μm or more, the corrosion resistance is more improved when the surface-treated steel sheet 1 is used for the battery container, and it is possible to more effectively prevent the gas generation in such an interior of a battery and the increase of the internal pressure of the interior of the battery due to the gas generation. Accordingly, the surface-treated steel sheet 1 of the present embodiment can be suitably used as the battery containers of the batteries such as alkaline batteries, the batteries using alkaline electrolytic solutions such as nickel-hydrogen batteries, and lithium-ion batteries.

EXAMPLES

Hereinafter, the present invention is described more specifically with reference to Examples, but the present invention is not limited to these Examples.

Reference Example A

As a base sheet, there was prepared a steel sheet 11 obtained by annealing a cold rolled sheet (thickness: 0.25 mm) of a low-carbon aluminum-killed steel having the chemical composition shown below:

C: 0.045% by weight, Mn: 0.23% by weight, Si: 0.02% by weight, P: 0.012% by weight, S: 0.009% by weight, Al: 0.063% by weight, N: 0.0036% by weight, the balance: Fe and inevitable impurities.

Then, the prepared steel sheet 11 was subjected to alkaline electrolytic degreasing and sulfuric acid immersion pickling, then subjected to electrolytic plating under the below-described conditions, and thus a nickel plating layer 13 was formed on the steel sheet 11 so as to have a deposition amount of 10.7 g/m$^2$. Subsequently, as for the thickness of the nickel plating layer 13, the deposition amount thereof was determined by performing a fluorescent X-ray measurement. The results thus obtained are shown in Table 1.

Bath composition: nickel sulfate: 250 g/L, nickel chloride: 45 g/L, boric acid: 45 g/L pH: 3.5 to 4.5

Bath temperature: 60° C.

Electric current density: 20 A/dm$^2$

Energizing time: 18 seconds

Next, the steel sheet 11 having the nickel plating layer 13 formed thereon was subjected to a thermal diffusion treatment by continuous annealing under the conditions of a heat treatment temperature of 430° C., a heat treatment time of 1 minute, and a reductive atmosphere, and thus an iron-nickel diffusion layer 12 and a nickel layer 14 were formed, to obtain a surface-treated steel sheet 1.

Next, the obtained surface-treated steel sheet 1 was subjected to a temper rolling under the condition of an extension percentage of 1%.

Then, by using the surface-treated steel sheet 1 after the temper rolling, according to the below-described methods, the measurement of the thickness of the iron-nickel diffusion layer 12 and the thickness of the nickel layer 14, the measurement of the surface hardness of the nickel layer 14, the measurement of the average crystal grain size of the nickel layer 14, and the observation of the surface with a scanning electron microscope (SEM) were performed.

<Measurement of Thickness of Iron-Nickel Diffusion Layer 12 and Thickness of Nickel Layer 14>

With respect to the surface-treated steel sheet 1, by using a high frequency glow discharge optical emission spectrometric analyzer, the variations of the Fe intensity and the Ni intensity were continuously measured in the depth direction from the outermost layer toward the steel sheet 11, the time giving the Fe intensity of 10% of the saturated value of the Fe intensity is taken as the starting point, the measurement time until the time giving the Ni intensity an intensity of 10% of the maximum value of the Ni intensity after the Ni intensity had exhibited the maximum value thereof was calculated, and on the basis of the calculated measurement time, the thickness of the iron-nickel diffusion layer 12 was determined. It is to be noted that when the thickness of the iron-nickel diffusion layer 12 was determined, the thickness of the iron-nickel diffusion layer 12 was measured, first, on the basis of the results (FIG. 5(C)) obtained by performing the high frequency glow discharge optical emission spectrometric analysis of the below-described nickel-plated steel sheet (Comparative Example 1) undergoing no thermal diffusion treatment, the measurements were performed by taking as the reference thickness the thickness measured as the iron-nickel diffusion layer (the value obtained by converting the measurement time into the thickness as follows: in FIG. 5(C), the time giving the Fe intensity 10% of the saturated value of the Fe intensity was taken as the starting point, the measurement time until the time giving the Ni intensity 10% of the maximum value after the Ni intensity had exhibited the maximum value thereof was converted into the thickness). It is to be noted that the reference thickness was 0.30 μm. In addition, the thickness of the actual iron-nickel diffusion layer 12 in Example 1 was determined by subtracting the reference thickness from the measurement result of the thickness of the iron-nickel diffusion layer 12 of the surface-treated steel sheet of Example 1. In addition, for the nickel layer 14, by taking as the starting point the time at which the measurement of the surface of the surface-treated steel sheet 1 was started with the high frequency glow discharge optical emission spectrometric analyzer, the measurement time until the Fe intensity was given an intensity of 10% of the saturated value of the Fe intensity was calculated, and on the basis of the calculated measurement time, the thickness of the nickel layer 14 was determined. Then, on the basis of the measurement result, the ratio of the thickness of the iron-nickel diffusion layer 12 to the thickness of the nickel layer 14 (thickness of iron-nickel diffusion layer 12/thickness of nickel layer 14) was determined. The results thus obtained are shown in FIG. 5(A) and Table 1. It is to be noted that, in Table 1, the ratio of (thickness of iron-nickel diffusion layer 12/thickness of nickel layer 14) was described as "Thickness ratio Fe—Ni/Ni."

It is to be noted that in relation to the measurement on the high frequency glow discharge optical emission spectrometric analyzer, the reference thickness calculated from the measurement of the nickel plating layer comes to be thick with the increase of the thickness of the nickel plating layer; and accordingly, it is preferable to examine the reference thickness in each of the plating amount when the iron-nickel diffusion layer is determined, or alternatively, it is preferable to determine the thickness of the iron-nickel diffusion layer by deriving the relation formula between the plating amount and the reference thickness by performing the reference thickness measurement of two or more samples different from each other in the plating amount, before being subjected to heat treatment.

<Measurement of Surface Hardness of Nickel Layer 14>

Figure 6:
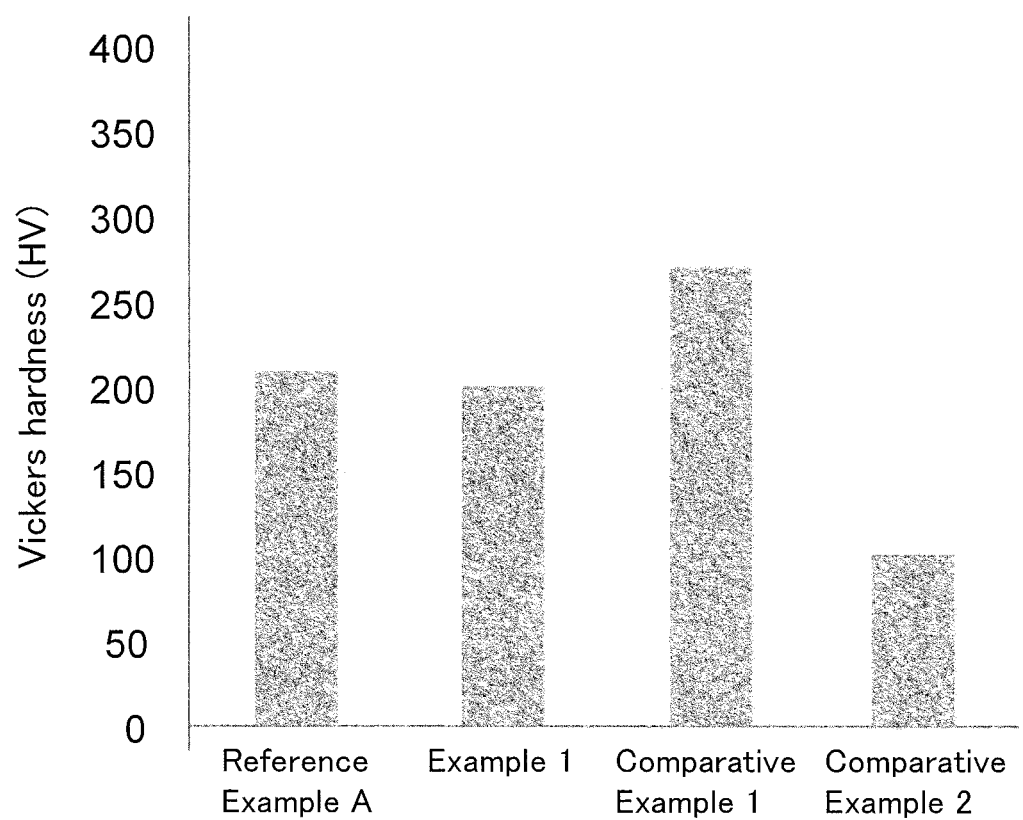
FIG. 6 presents the graphs showing the results of the surface hardness measurements of the surface-treated steel sheet for a battery container of Example and Comparative Examples.

For the nickel layer 14 of the surface-treated steel sheet 1, the surface hardness measurement was performed by measuring the Vickers hardness (HV) with a micro hardness tester (model: MVK-G2, manufactured by Akashi Seisakusho Co., Ltd.), by using a diamond indenter, under the conditions of a load of 10 gf and a holding time of 10 seconds. The results thus obtained are shown in FIG. 6.

<Measurement of Average Crystal Grain Size of Nickel Layer 14>

First, the surface of the surface-treated steel sheet 1 was etched. Specifically, 0.1 ml of an aqueous solution prepared by dissolving copper sulfate hydrate in a concentration of 200 g/L was dropwise placed on the surface of the surface-treated steel sheet 1, immediately thereafter 0.1 ml of hydrochloric acid was dropwise placed an the same surface, the aqueous solution and the hydrochloric acid were held for 30 seconds to perform etching, and subsequently the surface of the surface-treated steel sheet 1 was washed with water and dried. Next, a backscattered electron image of the surface of the surface-treated steel sheet 1 was obtained by using a scanning electron microscope (SEM), four straight line segments were drawn an the obtained backscattered electron image as shown in FIG. 7(A), and according to the above-described method, from the number of the crystal grains located on the individual straight line segments, the average crystal grain size of the nickel layer 14 was calculated. The results thus obtained are shown in FIG. 7(A) and Table 1.

<Observation of Surface with Scanning Electron Microscope (SEM)>

Figure 14:
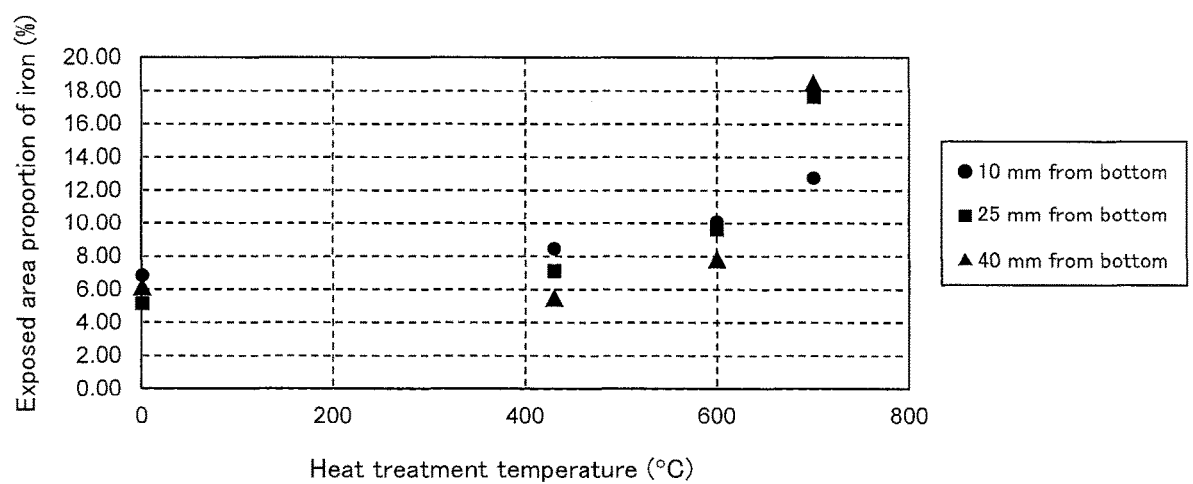
FIG. 14 is a graph showing the results of the measurements of the exposed area proportions of iron on the inner surfaces of the battery containers formed of the surface-treated steel sheets for a battery container of Example and Comparative Example.

By using the surface-treated steel sheet 1, a LR6 (JIS) battery container was prepared in such a way that the nickel layer 14 was placed an the inner surface side of the battery container, and the thickness of the can wall is 0.15 mm. Then, in the obtained battery container, the portions of 10 mm, 25 mm, and 40 mm from the bottom were measured with a scanning electron microscope (SEM) and an energy dispersion type X-ray analysis, and thus the backscattered electron images, the element maps of iron, and the element maps of nickel were obtained. The results thus obtained are shown in FIGS. 8(A) to 8(C). It is to be noted that in FIGS. 8(A) to 8(C), the images denoted by "Image" are the backscattered electron images, and the images denoted by "Feka" are the element maps of iron and the images denoted by "Nika" are the element maps of nickel. It is to be noted that in the element maps of iron, the portions where the kα lines due to iron were observed are white. Also, in the element maps of nickel, similarly, the portions where the kα lines due to nickel were observed are white. The images of the element maps of iron were binarized with an image processing software, and the area proportion of the white portions in relation to the whole of the obtained image (namely, the exposed area proportion of iron) was measured. The results thus obtained are shown in FIG. 14 and Table 2.

Example 1

A surface-treated steel sheet 1 was prepared in the same manner as in Reference Example A except that the heat treatment temperature was set to be 600° C. when the thermal diffusion treatment was performed for the steel sheet 11 having a nickel plating layer 13 formed thereon; and the measurements and the observations were performed in the same manner. The results thus obtained are shown in FIGS. 5(B), 6, 7(B), 9, and 14, and Tables 1 and 2.

Comparative Example 1

A nickel-plated steel sheet was prepared under the same conditions as in Example 1 except that the steel sheet 11 having a nickel plating layer 13 formed thereon was not subjected to either of the thermal diffusion treatment and the temper rolling. Then, the prepared nickel-plated steel sheet was subjected to measurements, as described above, on the basis of the high frequency glow discharge optical emission spectrometric analysis to obtain the measurement results shown in FIG. 5(C), and the measurements were performed by taking as the reference thickness the thickness measured as the iron-nickel diffusion layer (the value obtained by converting the measurement time into the thickness as follows: in FIG. 5(C), the time giving the Fe intensity 10% of the saturated value of the Fe intensity was taken as the starting point, the measurement time until the time giving the Ni intensity 10% of the maximum value after the Ni intensity had exhibited the maximum value thereof was converted into the thickness). It is to be noted that in Comparative Example 1, the surface hardness and the average crystal grain size of the nickel plating layer 13 were measured, in place of the surface hardness and the average crystal grain size of the nickel layer 14. It is to be noted that in Comparative Example 1, when the average crystal grain size of the nickel plating layer 13 was measured, the surface etching was not performed. The results thus obtained are shown in FIGS. 5(C), 6, 7(C), 10, and 14, and Tables 1 and 2.

Comparative Example 2

A surface-treated steel sheet 1 was prepared in the same manner as in Example 1 except that the heat treatment temperature was set to be 700° C. when the thermal diffusion treatment was performed for the steel sheet 11 having a nickel plating layer 13 formed thereon, and no temper rolling was performed; and the measurements and the observations were performed in the same manner. It is to be noted that in Comparative Example 2, when the average crystal grain size of the nickel layer 14 was measured, the surface etching was not performed. The results thus obtained are shown in FIGS. 5(D), 6, 7(D), 11, and 14, and Tables 1 and 2.

TABLE 1

| | Before heat treatment | Heat treatment Conditions | | After heat treatment | | | |
|---|---|---|---|---|---|---|---|
| | | | | | | Iron-nickel diffusion | Thickness | Nickel layer 14 |
| | Plating amount (g/m²) | Temperature [° C.] | Time [min] | Nickel layer 14 Thickness [μm] | layer 12 Thickness [μm] | ratio Fe-Ni/Ni | Average crystal grain size [μm] |
| Reference Example A | 10.7 | 430 | 1 | 1.12 | More than 0 μm, less than 0.04 μm | 0 < | 0.21 |
| Example 1 | 10.7 | 600 | 1 | 1.17 | 0.24 | 0.205 | 0.45 |
| Comparative Example 1 | 10.7 | — | — | Reference thickness | Reference thickness | | 0.05* |
| Comparative Example 2 | 10.7 | 700 | 1 | 0.65 | 0.5 | 0.769 | 0.93 |

*The average crystal grain size of the nickel plating layer 13 was measured.

TABLE 2

| | Heat treatment conditions | | | Exposed area proportion of iron [%] |
|---|---|---|---|---|
| | Temperature [° C.] | Time [min] | Measurement positions | |
| Reference Example A | 430 | 1 | 10 mm from bottom | 8.46 |
| | | | 25 mm from bottom | 7.12 |
| | | | 40 mm from bottom | 5.52 |
| Example 1 | 600 | 1 | 10 mm from bottom | 10.08 |
| | | | 25 mm from bottom | 9.63 |
| | | | 40 mm from bottom | 7.84 |
| Comparative Example 1 | — | — | 10 mm from bottom | 6.85 |
| | | | 25 mm from bottom | 5.15 |
| | | | 40 mm from bottom | 6.15 |
| Comparative Example 2 | 700 | 1 | 10 mm from bottom | 12.74 |
| | | | 25 mm from bottom | 17.63 |
| | | | 40 mm from bottom | 18.50 |

Reference Example 1

As a base sheet, the same steel sheet 11 as in Example 1 was prepared. Then, the prepared steel sheet 11 was subjected to alkaline electrolytic degreasing and sulfuric acid immersion pickling, then subjected to electrolytic plating under the below-described conditions, and thus a nickel plating layer 13 was formed on the steel sheet 11 so as to have a thickness of 20 m. It is to be noted that as for the thickness of the nickel plating layer 13, the deposition amount thereof was determined by performing a fluorescent X-ray measurement.

Bath composition: Nickel sulfate: 250 g/L, nickel chloride: 45 g/L, boric acid: 45 g/L
pH: 3.5 to 4.5
Bath temperature: 60° C.

Figure 12:
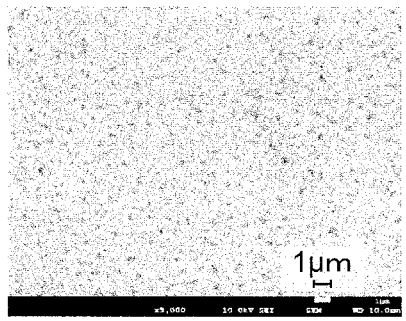
FIG. 12 presents the photographs showing the backscattered electron images of the surface-treated steel sheets for a battery container of Reference Examples.
Figure 12:
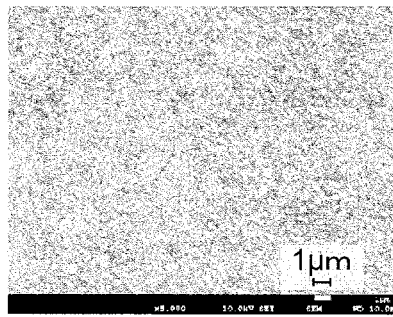
Figure 12:
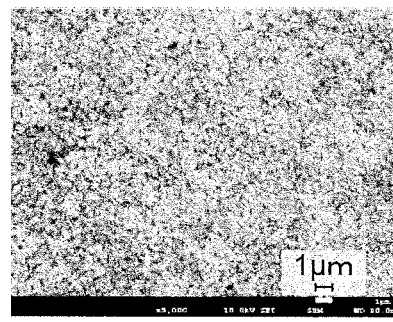
Figure 12:
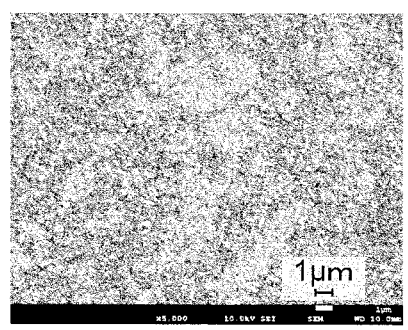
Figure 12:
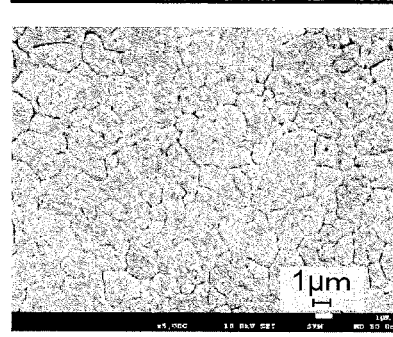
Figure 13:
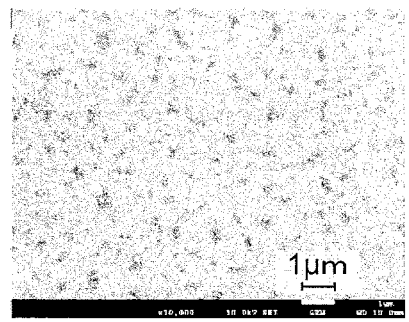
FIG. 13 presents the photographs obtained by enlarging the backscattered electron images shown in the FIG. 12.
Figure 13:
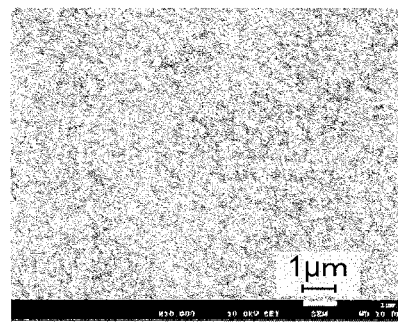
Figure 13:
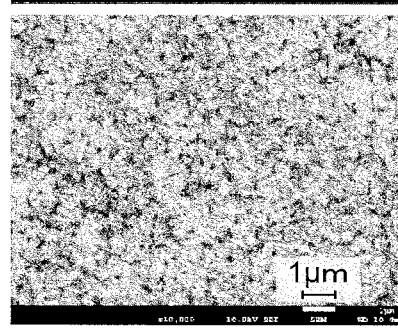
Figure 13:
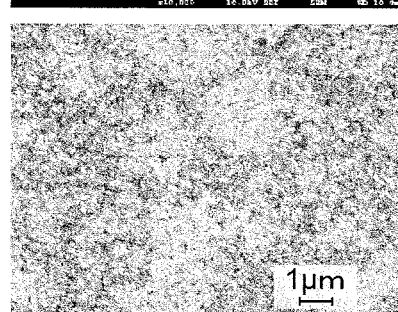
Figure 13:
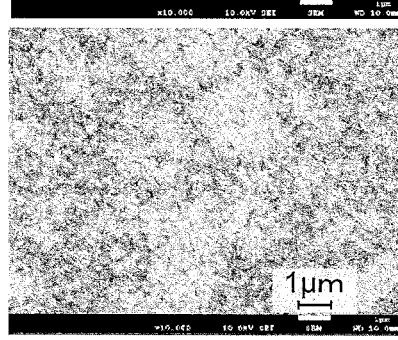

Then, a backscattered electron image of the surface of the steel sheet 11 having the nickel plating layer 13 formed thereon was obtained by measuring with a scanning electron microscope (SEM). The results thus obtained are shown in FIGS. 12(A) and 13(A). It is to be noted that FIG. 13(A) is an image obtained by enlarging FIG. 12(A).

Figure 15:
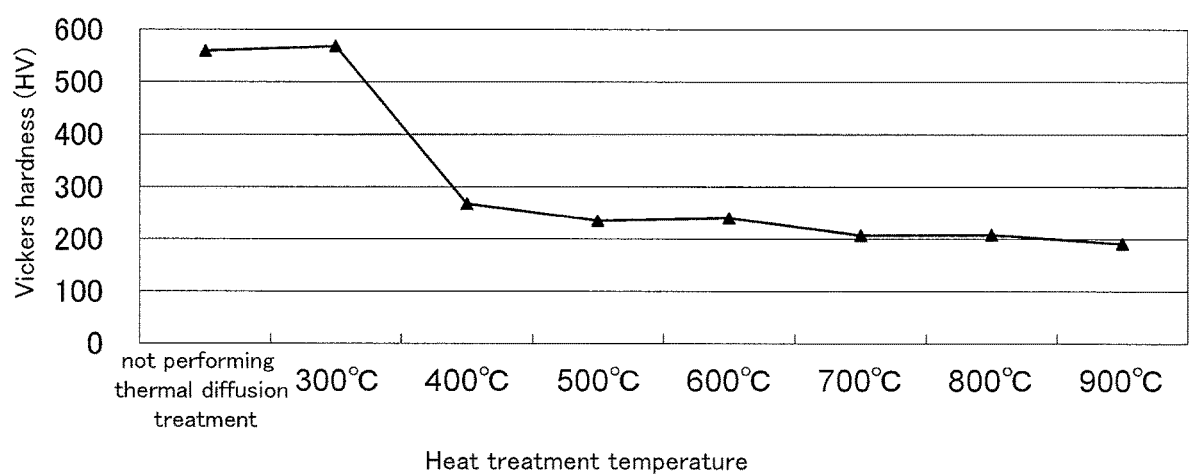
FIG. 15 is a graph showing the results of the measurement of the surface hardness of a steel sheet having a nickel plating layer formed thereon, after the application of a heat treatment.

Next, for the steel sheet 11 having the nickel plating layer 13 formed thereon, the measurement of the surface hardness of the nickel plating layer 13 was performed by the same method as in the above-described measurement of the surface hardness of the nickel layer 14. The results thus obtained are shown in FIG. 15.

Reference Example 2

A steel sheet 11 was prepared in the same manner as in Reference Example 1, and a nickel plating layer 13 was formed on the steel sheet 11. Next, the steel sheet 11 having the nickel plating layer 13 formed thereon was subjected to a thermal diffusion treatment by continuous annealing under the conditions of a heat treatment temperature of 300° C., a heat treatment time of 41 seconds, and a reductive atmosphere, and thus an iron-nickel diffusion layer 12 and a nickel layer 14 were formed, to obtain a surface-treated steel sheet 1.

Then, a backscattered electron image of the surface of the obtained surface-treated steel sheet 1 was obtained in the same manner as in Reference Example 1, and the measurement of the surface hardness of the nickel layer 14 was performed. The results thus obtained are shown in FIG. 15.

Reference Examples 3 to 8

Surface-treated steel sheets 1 were prepared in the same manner as in Reference Example 2 except that when the steel sheet 11 having a nickel plating layer 13 formed thereon was subjected to the thermal diffusion treatment, the heat treatment temperature was set to be 400° C. (Reference Example 3), 500° C. (Reference Example 4), 600° C. (Reference Example 5), 700° C. (Reference Example 6), 800° C. (Reference Example 7), and 900° C. (Reference Example 8); the measurements were performed in the same manner as in Reference Example 1. The results thus obtained are shown in FIGS. 12(B) to 12(E), 13(B) to 13(E), and 15.

Figure 8:
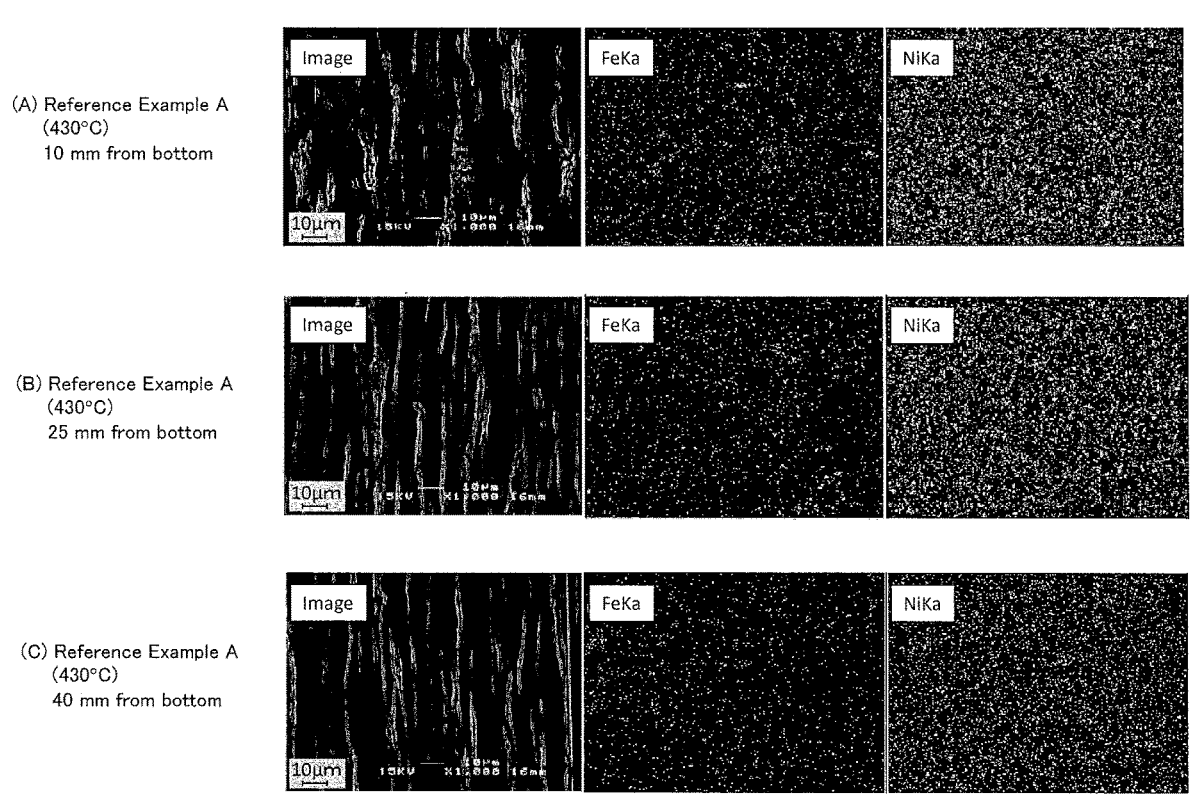
FIG. 8 presents the photographs showing the backscattered electron images, the element maps of iron and the element maps of nickel of the inner surface of the battery container formed of the surface-treated steel sheet for a battery container of Reference Example A.
Figure 9:
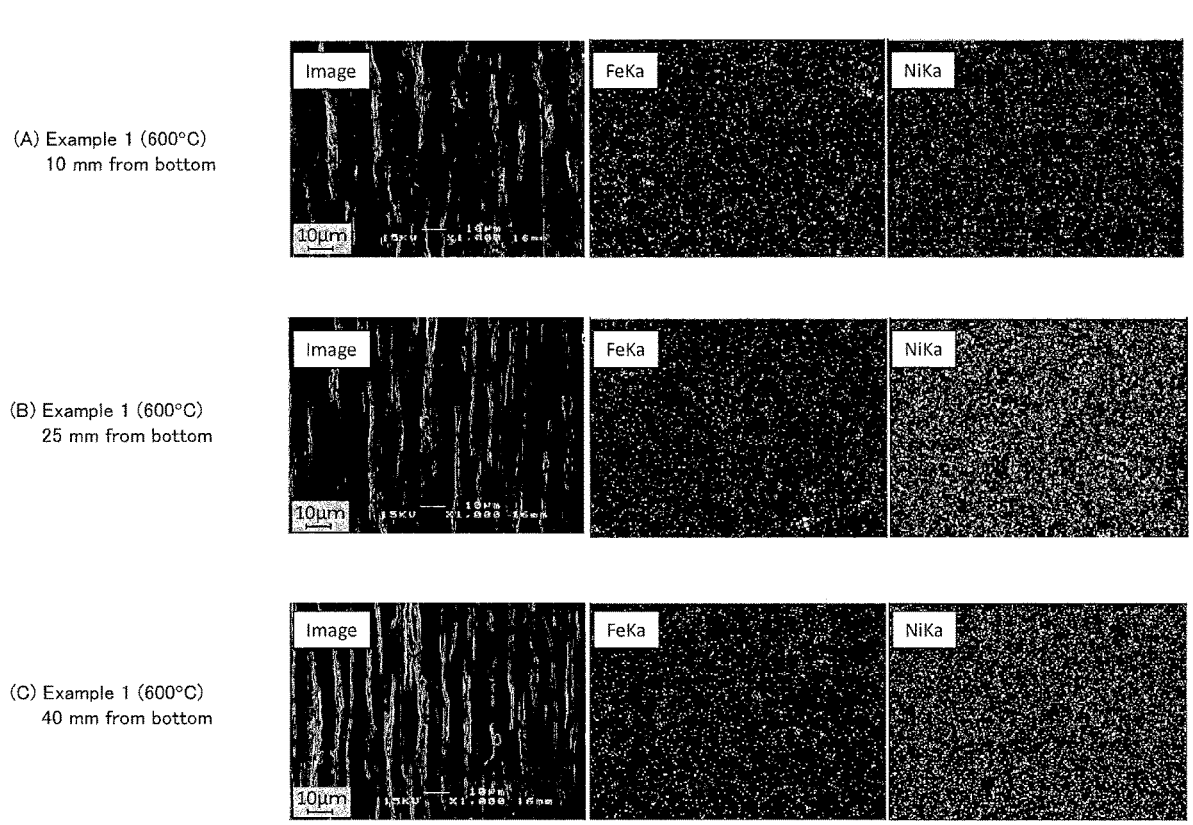
FIG. 9 presents the photographs showing the backscattered electron images, the element maps of iron and the element maps of nickel of the inner surface of the battery container formed of the surface-treated steel sheet for a battery container of Example 1.
Figure 10:
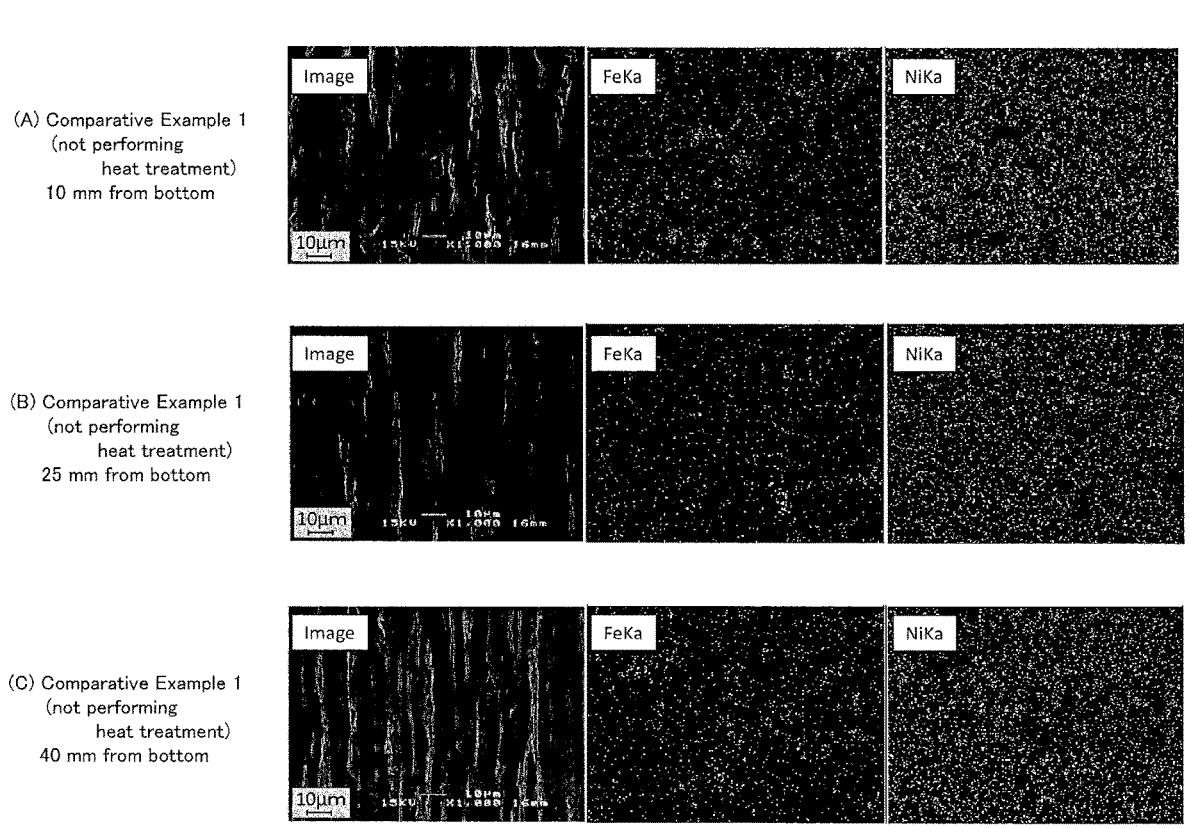
FIG. 10 presents the photographs showing the backscattered electron images, the element maps of iron and the element maps of nickel of the inner surface of the battery container formed of the surface-treated steel sheet for a battery container of Comparative Example 1.

As shown in Table 1, in Reference Example A and Example 1 in each of which the thickness of the iron-nickel diffusion layer 12 is 0.04 to 0.31 μm, and the total amount of the nickel contained in the iron-nickel diffusion layer and the nickel contained in the nickel layer is 4.4 g/m² or more and less than 10.8 g/m², the kα lines of iron originating from the diffusion of the steel sheet 11 up to the surface of the surface-treated steel sheet 1 were not observed as shown in the element maps of iron in FIGS. 8 and 9. Specifically, as shown in FIG. 14 and Table 2, in each of Reference Example A and Example 1, the area proportion (the exposed area proportion of iron) of the white portions in relation to the whole of the element map of iron was as small as 11% or less, and the kα lines of iron originating from the diffusion of the steel sheet 11 up to the surface of the surface-treated steel sheet 1 were not observed. It is to be noted that in the element map of iron in each of FIGS. 8 and 9, the white portions in which the kα line of iron was observed were sparsely present, and this was probably caused by the extremely slight exposure of the steel sheet 11 through fine scratches on the surface of the surface-treated steel sheet 1, and it can be determined that such white portions were not caused by the diffusion of the steel sheet 11 up to the surface of the surface-treated steel sheet 1, due to the thermal diffusion treatment.

Figure 7:
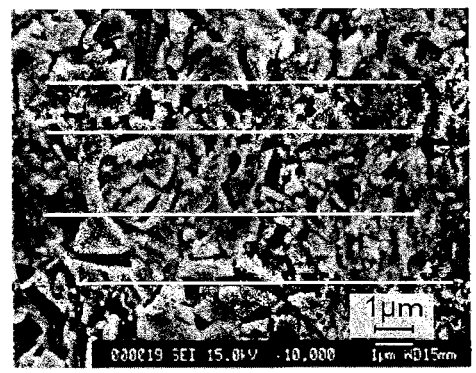
FIG. 7 presents the photographs showing the backscattered electron images of the surface-treated steel sheets for a battery container of Example and Comparative Examples.
Figure 7:
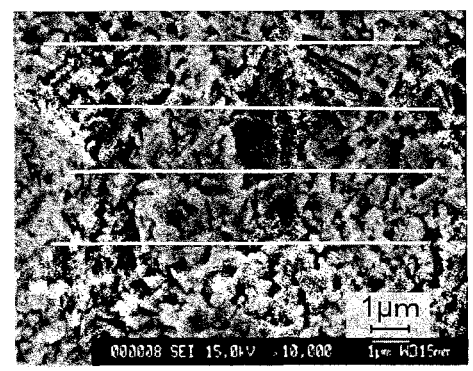
Figure 7:
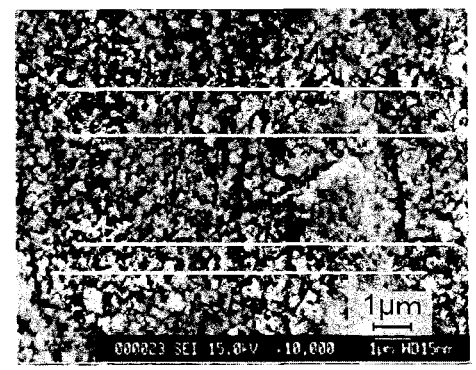
Figure 7:
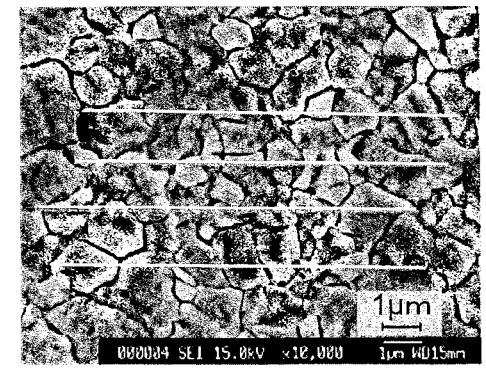

In addition, as shown in FIG. 7, in Reference Example A and Example 1 involving the application of the thermal diffusion treatment, as compared with Comparative Example 1 free from the application of the thermal diffusion treatment, it can be seen that with the increase of the heat treatment temperature in the thermal diffusion treatment, the crystal grains grew (namely, the crystal grain sizes were increased). This is probably ascribable to the progress of the recrystallization of the grains constituting the nickel layer 14 to increase the crystal grain sizes with the increase of the heat treatment temperature.

In addition, as shown in FIG. 15, from the measurement results of the surface hardness in Reference Examples 1 to 8, it can be verified that by setting the heat treatment temperature in the thermal diffusion treatment to be higher than 300° C., the surface hardness of the nickel layer 14 was decreased (the nickel plating layer 13 is softened). This fact suggests that the recrystallization of the grains constituting the nickel layer 14 was allowed to progress. It is to be noted that in Reference Examples 1 to 8, the thickness of the nickel plating layer 13 was set to be as thick as 20 μm, and accordingly, the hardness of the nickel layer 14 was able to be appropriately measured, without being affected by the steel sheet 11 serving as the substrate. Accordingly, it is conceivable that in Reference Example A and Example 1 setting the heat treatment temperature of the thermal diffusion treatment to be 400° C. or 630° C., the recrystallization of the grains constituting the nickel layer 14 is allowed to progress, and the surface hardness of the nickel layer 14 is allowed to be appropriate.

On the other hand, as shown in Table 1, Comparative Example 1 free from the application of the thermal diffusion treatment, the average crystal grain size of the nickel layer 14 ended up with less than 0.2 µm. Herewith, it is conceivable that in Comparative Example 1, the surface hardness of the nickel layer 14 came to be too high, and when the surface-treated steel sheet 1 was mold-processed into a battery container, deep cracks to reach the steel sheet 11 were caused in the surface-treated steel sheet 1, the iron of the steel sheet 11 was exposed, and the corrosion resistance of the battery container was degraded.

Figure 11:
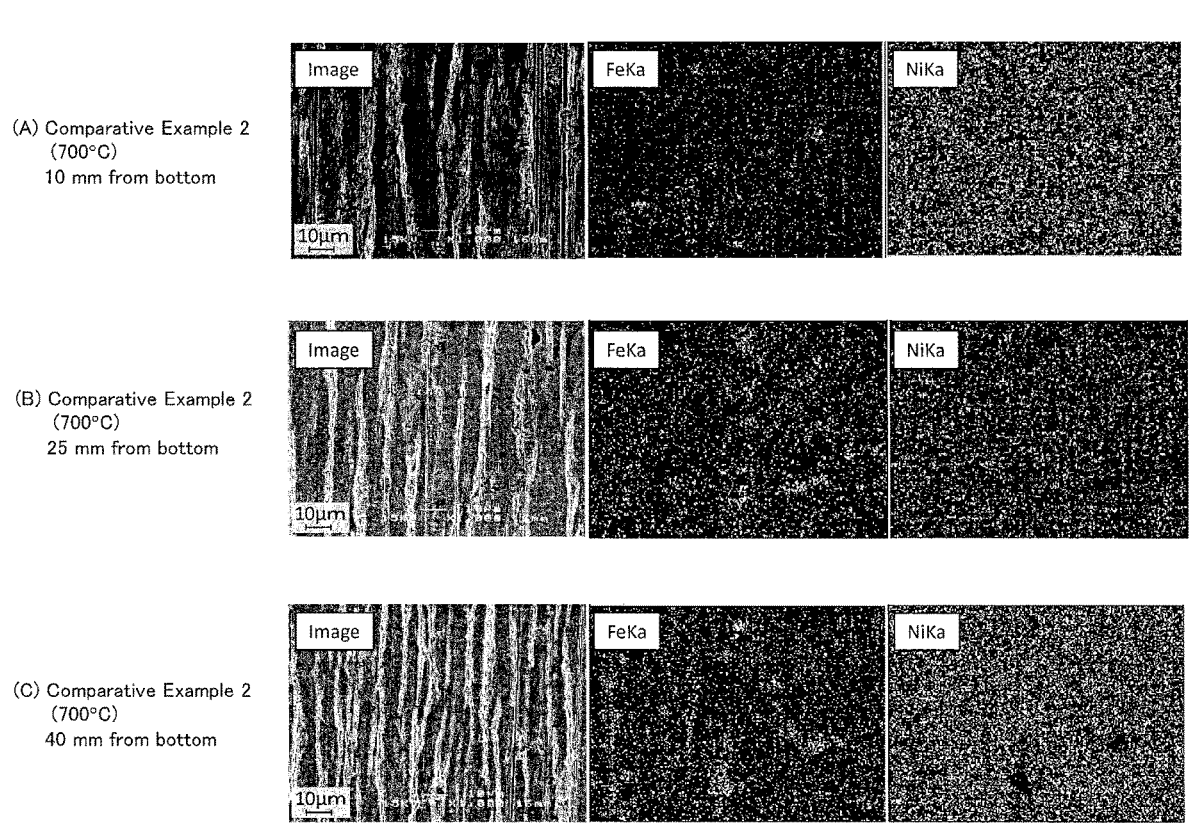
FIG. 11 presents the photographs showing the backscattered electron images, the element maps of iron and the element maps of nickel of the inner surface of the battery container formed of the surface-treated steel sheet for a battery container of Comparative Example 2.

In addition, as shown in Table 1, in Comparative Example 2 setting the heat treatment temperature of the thermal diffusion treatment to be 700° C., the thickness of the iron-nickel diffusion layer 12 ended up to be 0.5 µm or more, and the thickness of the nickel layer 14 came to be less than 0.85 µm; herewith, as shown in the element maps of iron in FIG. 11, the kα lines of iron originating from the diffusion of the iron of the steel sheet 11 up to the vicinity of the surface of the surface-treated steel sheet 1 were observed. In other words, as compared with above-described FIGS. 8 and 9, in the element maps of iron in FIG. 11, the white points originating from the kα lines of iron are larger in number, and moreover present in a getting together manner (actually, when referring to FIG. 14 and Table 2, in the element maps of iron in each of FIGS. 8 and 9 (Reference Example A, Example 1), the area proportions (the exposed area proportion of iron) of the white portions in relation to the whole of the image is 11% or less; on the other hand, in the element maps of iron of FIG. 11 (Comparative Example 2), the proportions concerned are as high as 15% or more at the positions of 25 mm and 40 mm from the bottom).

In particular, in Comparative Example 2 adopting a heat treatment temperature of 700° C., as compared with Reference Example A and Example 1 adopting heat treatment temperatures of 430° C. and 600° C., respectively, the exposed area proportion of iron is increased at any of the positions of 10 mm, 25 mm and 40 mm, respectively, from the bottom of the battery container. Such an increase of the exposed area proportion of iron in Comparative Example 2 is particularly remarkable at the positions of 25 mm and 40 mm from the bottom of the battery container. This indicates that when the battery container is formed by using the surface-treated steel sheet 1, with the increase of the distance from the bottom of the battery container, namely, with the decrease of the distance from the opening of the battery container, the surface-treated steel sheet 1 undergoes the drawing forces in the stretching direction (the press direction during being molded into the battery container) and the circumferential direction, and consequently undergoes a higher load processing in each of these directions.

It is conceivable that in Comparative Example 2 adopting a heat treatment temperature of 700° C., the thermal diffusion treatment proceeded to an excessive extent, to make the thickness of the nickel layer 14 too thin, and accordingly, in the portions undergoing the application of the above-described high load processing (the portions distant from the bottom of the battery container), the exposure of the iron of the steel sheet 11 is increased. This can also be verified from the element maps of iron and the element maps of nickel, shown in FIG. 11. Specifically, when referring to FIG. 11, in the element maps of iron, with the increase of the distance from the bottom of the battery container, the exposed area proportion of iron is increased, and the portions allowing iron to be exposed in a getting together manner are increased. When such element maps of iron are compared with the corresponding element maps of nickel, the positions of the portions allowing iron to be exposed in a getting together manner in the element maps of iron correspond to the positions of the portions having smaller detection amounts of nickel in the element maps of nickel. Herewith, it is possible to verify that in Comparative Example 2, the exposure of iron is increased in the thinner-thickness portions of the nickel layer 14.

From this fact, it is conceivable that the diffusion of the iron of the steel sheet 11 up to the vicinity of the surface of the surface-treated steel sheet 1 allows the iron-nickel diffusion to proceed to an excessive extent, consequently the nickel layer of the surface layer canes to be too thin, and accordingly, when the surface-treated steel sheet 1 is press molded, the coating with nickel on the inner surface of the battery can comes to be incomplete. Moreover, as shown in Table 1, in Comparative Example 2, the average crystal grain size of the nickel layer 14 was more than 0.6 µm, and as can be seen from FIG. 6, the Vickers hardness was lower as compared with the Vickers hardnesses of Reference Example A and Example 1.

It is to be noted that as far as the numerical values of the exposed area proportion of iron shown in FIG. 14 and Table 2, Comparative Example 1 free from the application of the thermal diffusion treatment tends to exhibit lower values as compared with Reference Example A and Example 0.1 undergoing a thermal diffusion treatment at 430° C. and 600° C., respectively. However, when referring to the element maps shown in FIG. 10, in Comparative Example 1, as compared with the element maps of Reference Example A and Example 1 shown in FIGS. 8 and 9, respectively, the exposure of iron tends to occur at specific positions in a getting together manner, and in particular, this tendency is remarkable in the element map at a position of 10 mm from the bottom of the battery container. This is probably ascribable to the too hard nickel plating layer 13 on the surface in Comparative Example 1 free from the application of a thermal diffusion treatment. In other words, when the surface-treated steel sheet 1 is molded into a battery container, the bottom portion of the battery container is brought into contact with the circumferential portion of the punch used for press to undergo bending work; the surface-treated steel sheet 1 of Comparative Example 1 has the too hard nickel plating layer 13 on the surface, and accordingly, during this bending work, deep cracks tend to be generated on the surface of the surface-treated steel sheet 1. Accordingly, in the case where the surface-treated steel sheet 1 of Comparative Example 1 is used as a battery container, when deep cracks are generated on the surface thereof, iron is locally exposed to be dissolved into the electrolytic solution, and gas is liable to be generated in the interior of the battery along with the dissolution of iron. The generation of such gas is liable to increase the internal pressure in the interior of the battery.

Example 2

As a base sheet, there was prepared a steel sheet 11 obtained by annealing a cold rolled sheet (thickness: 0.25 m) of a low-carbon aluminum-killed steel having the chemical composition shown below:

C: 0.045% by weight, Mn: 0.23% by weight, Si: 0.02% by weight, P: 0.012% by weight, S: 0.009% by weight, Al: 0.063% by weight, N: 0.0036% by weight, the balance: Fe and inevitable impurities Then, the prepared steel sheet 11 was subjected to alkaline electrolytic degreasing and sulfuric acid immersion pickling, then subjected to electrolytic plating under the below-described conditions, and thus a nickel plating layer 13 was formed on the steel sheet 11 so as to have a deposition amount of 8.9 g/m². Subsequently, as for the thickness of the nickel plating layer 13, the deposition amount thereof was determined by performing a fluorescent X-ray measurement.

Bath composition: Nickel sulfate: 250 g/L, nickel chloride: 45 g/L, boric acid: 45 g/L
pH: 3.5 to 4.5
Bath temperature: 60° C.
Electric current density: 20 A/dm²
Energizing time: 16 seconds Next, the steel sheet 11 having the nickel plating layer 13 formed thereon was subjected to a thermal diffusion treatment by continuous annealing under the conditions of a heat treatment temperature of 480° C., a heat treatment time of 30 seconds, and a reductive atmosphere, and thus an iron-nickel diffusion layer 12 and a nickel layer 14 were formed, to obtain a surface-treated steel sheet 1.

Next, the obtained surface-treated steel sheet 1 was subjected to a temper rolling under the condition of an extension percentage of 1%. The thickness of the surface-treated steel sheet 1 after the temper rolling was 0.250 mm.

Then, by using the surface-treated steel sheet 1, according to the above-described method, the thicknesses of the iron-nickel diffusion layer 12 and the nickel layer 14 were measured. In addition, on the basis of the measured results, the ratio of the thickness of the iron-nickel diffusion layer 12 to the thickness of the nickel layer 14 (thickness of iron-nickel diffusion layer 12/thickness of nickel layer 14) was determined. The results thus obtained are shown in Table 3.

Examples 3 to 9

In each of Examples 3 to 9, a surface-treated steel sheet 1 was obtained in the same manner as in Example 3 except that the thickness of the nickel plating layer 13, and the continuous annealing conditions (heat treatment conditions) for the steel sheet 11 having a nickel plating layer 13 formed thereon were altered as shown in Table 3, and the measurements were performed in the same manner. The results thus obtained are shown in Table 3.

Comparative Example 3

A nickel-plated steel sheet was prepared under the same conditions as in Example 3 except that neither a continuous annealing nor a temper rolling was performed after the formation of the nickel plating layer 13. The results thus obtained are shown in Table 3.

Comparative Examples 4 to 6

In each of Comparative Examples 4 to 6, a surface-treated steel sheet 1 was obtained in the same manner as in Example 3 except that the thickness of the nickel plating layer 13, and the continuous annealing conditions (heat treatment conditions) for the steel sheet 11 having a nickel plating layer 13 formed thereon were altered as shown in Table 3, and the measurements were performed in the same manner. The results thus obtained are shown in Table 3.

TABLE 3

| | Before heat treatment | Heat treatment conditions | | After heat treatment | | |
| --- | --- | --- | --- | --- | --- | --- |
| | Plating amount (g/m²) | Temperature [° C.] | Time | Nickel layer 14 Thickness [μm] | Iron-nickel diffusion layer 12 Thickness [μm] | Thickness ratio Fe-Ni/Ni |
| Example 2 | 10.1 | 480 | 30 sec | 1.09 | 0.10 | 0.092 |
| Example 3 | 4.5 | 500 | 30 sec | 0.47 | 0.07 | 0.159 |
| Example 4 | 9.2 | 500 | 30 sec | 0.97 | 0.13 | 0.13 |
| Example 5 | 9.9 | 500 | 30 sec | 1.04 | 0.14 | 0.135 |
| Example 6 | 10.0 | 500 | 60 sec | 1.05 | 0.14 | 0.133 |
| Example 7 | 10.1 | 550 | 30 sec | 1.06 | 0.15 | 0.142 |
| Example 8 | 9.8 | 580 | 60 sec | 1.00 | 0.20 | 0.200 |
| Example 9 | 10.7 | 600 | 30 sec | 1.07 | 0.26 | 0.243 |
| Comparative Example 3 | 9.0 | — | — | 1.00 | Absent | — |
| Comparative Example 4 | 9.7 | 500 | 60 min | 0.91 | 0.35 | 0.39 |
| Comparative Example 5 | 9.9 | 700 | 30 sec | 0.89 | 0.44 | 0.494 |
| Comparative Example 6 | 18.6 | 700 | 30 sec | 1.87 | 0.45 | 0.241 |

Next, the surface-treated steel sheets 1 of Examples 3 and 4 and Comparative Examples 4 to 6, and the nickel-plated steel sheet of Comparative Example 3 were evaluated according to the below-described method, with respect to the corrosion resistance when each of these steel sheets was molded into a battery container.

<Evaluation of Corrosion Resistance (1)>

A blank was prepared by punching out a surface-treated steel sheet 1 into a predetermined shape with a press machine, the obtained blank was subjected to a drawing processing under the below-described conditions in such a way that the nickel layer 14 was on the inner surface side, and thus a battery container was prepared (it is to be noted that when a nickel-plated steel sheet was used, a battery container was prepared in such a way that the nickel plating layer 13 was on the inner surface side). Specifically, a tubular body was obtained by applying a drawing and ironing processing to the blank by using a drawing and ironing machine including drawing dies (or ironing dies) arranged in six stages and a punch, and a battery container was obtained by cutting the lug part in the vicinity of the opening of the obtained tubular body. The drawing processing used the dies in each of which the clearance was set in such a way that the thickness of the can wall at a position of 10 mm from the can bottom after processing was ±5%. Next, the obtained battery container was evaluated with respect to the amount of Fe ions dissolved as follows: the obtained battery container was filled with a 10 mol/L potassium hydroxide solution, sealed and stored under the conditions of 60° C., 480 hours, then the amount of Fe ions dissolved from the inner surface of the battery container into the solution was measured with a high frequency inductively coupled plasma emission spectrometric analyzer (ICP) (ICPE-9000, manufactured by Shimadzu Corp.), and the amount of Fe ions dissolved was evaluated on the basis of the following standards. When the evaluation was A or B in the following standards, the dissolution of iron from the inner surface of the battery container was determined to be sufficiently suppressed. The results thus obtained are shown in Table 4.

A: The amount of Fe ions dissolved was less than 33 mg/L.

B: The amount of Fe ions dissolved was 33 to 35 mg/L.

C: The amount of Fe ions dissolved was more than 35 mg/L.

Comparative Example 5 was equal to or lower than this Comparative Example 6 with respect to the corrosion resistance.

In addition, it is conceivable that the surface-treated steel sheet of Comparative Example 6 was too large in the total amount of the nickel contained in the iron-nickel diffusion layer and the nickel contained in the nickel layer was too large (the thickness of the nickel plating layer 13 was too thick), and accordingly gave a too thick can wall and decreased the volume percentage when used as a battery container.

Next, the surface-treated steel sheet 1 of each of Examples 3 and 4 and Comparative Example 4 was subjected to a drawing and ironing processing with a higher load than in the corrosion evaluation (1) to prepare a battery container, according to the below-described method, and evaluated

TABLE 4

| | Before heat treatment | Heat treatment conditions | | After heat treatment | | | Evaluation of corrosion resistance (1) Evaluation*[1] |
|---|---|---|---|---|---|---|---|
| | Plating amount (g/m$^2$) | Temperature [° C.] | Time | Nickel layer 14 Thickness [μm] | Iron-nickel diffusion layer 12 Thickness [μm] | Thickness ratio Fe-Ni/Ni | |
| Example 3 | 4.5 | 500 | 30 sec | 0.47 | 0.07 | 0.159 | A |
| Example 4 | 9.2 | 500 | 30 sec | 0.97 | 0.13 | 0.13 | A |
| Comparative Example 3 | 9.0 | — | — | 1.0 | Absent | — | B |
| Comparative Example 4 | 9.7 | 500 | 60 min | 0.91 | 0.35 | 0.39 | B |
| Comparative Example 5 | 9.9 | 700 | 30 sec | 0.89 | 0.44 | 0.494 | C |
| Comparative Example 6 | 18.6 | 700 | 30 sec | 1.87 | 0.45 | 0.241 | B |

*[1]Evaluation standards:
A: less than 33
B: 33 to 35
C: more than 35

As shown in Table 4, Examples 3 and 4 in each of which the thickness of the iron-nickel diffusion layer 12 was 0.04 to 0.31 μm, and the total amount of the nickel contained in the iron-nickel diffusion layer and the nickel contained in the nickel layer was 4.4 g/m$^2$ or more and less than 10.8 g/m$^2$ gave the results that Examples 3 and 4 were both evaluated as excellent in corrosion resistance. In other words, it has been verified that Examples 3 and 4 each have a corrosion resistance equal to or higher than the corrosion resistances of Comparative Examples 5 and 6, when Comparative Examples 5 and 6 having the corrosion resistances equal to or higher than the corrosion resistances of conventional surface-treated steel sheets are taken as references.

On the other hand, as shown in Table 4, Comparative Example 3 free from the application of a thermal diffusion treatment was good in the evaluation result of the corrosion resistance, but did not form the iron-nickel diffusion layer 12 due to the omission of the thermal diffusion treatment, and is accordingly conceived to be poor in the adhesiveness of the nickel plating layer 13.

Moreover, even in the case where a thermal diffusion treatment was performed, the thickness of the iron-nickel diffusion layer 12 was made too thick due to an excessive thermal diffusion treatment, iron was probably exposed to the surface of the nickel layer 14; as in the case of Comparative Example 5, when Comparative Example 6 having the corrosion resistance equivalent to the corrosion resistances of conventional surface-treated steel sheets was taken as the reference, Comparative Example 5 gave the result that with respect to the corrosion resistance of the battery container, under more severe conditions.

<Evaluation of Corrosion Resistance (2)>

The preparation of a battery container and the measurement of the amount of Fe ions dissolved were performed in the same manner as in the evaluation of corrosion resistance (1) except that a battery container was prepared by performing a drawing processing with a higher load than in the evaluation of corrosion resistance (1) with respect to the six stages of drawing dies (or ironing dies) in the drawing and ironing machine, as described below, and the evaluation was performed on the basis of the following standards. The results thus obtained are shown in Table 5.

The drawing and ironing processing used the dies in each of which the clearance was set in such a way that the thickness of the can wall at a position of 10 mm from the can bottom after processing was 0.15 nm.

In addition, the amount of Fe ions dissolved from the inner surface of the battery container into the solution was evaluated on the basis of the following standards. When the evaluation was A or B in the following standards, the dissolution of iron from the inner surface of the battery container was determined to be sufficiently suppressed.

A: The amount of Fe ions dissolved was less than 35 mg/L.

B: The amount of Fe ions dissolved was 35 to 38 mg/L.

C: The amount of Fe ions dissolved was more than 38 mg/L.

TABLE 5

| | Before heat treatment | Heat treatment conditions | | After heat treatment | | | Evaluation of corrosion |
|---|---|---|---|---|---|---|---|
| | Plating amount (g/m²) | Temperature [° C.] | Time | Nickel layer 14 Thickness [μm] | Iron-nickel diffusion layer 12 Thickness [μm] | Thickness ratio Fe-Ni/Ni | resistance (2) Evaluation*² |
| Example 3 | 4.5 | 500 | 30 sec | 0.47 | 0.07 | 0.159 | B |
| Example 4 | 9.2 | 500 | 30 sec | 0.97 | 0.13 | 0.13 | A |
| Comparative Example 4 | 9.1 | 500 | 60 min | 0.91 | 0.35 | 0.39 | C |

*²Evaluation standards:
A: less than 35
B: 35 to 38
C: more than 38

As shown in Table 5, Examples 3 and 4 in each of which the thickness of the iron-nickel diffusion layer 12 was 0.04 to 0.31 μm, and the total amount of the nickel contained in the iron-nickel diffusion layer and the nickel contained in the nickel layer was 4.4 g/m² or more and less than 10.8 g/m² gave the results that Examples 3 and 4 were evaluated as excellent in corrosion resistance even in the case where the battery containers were prepared by performing the drawing and ironing processing with a higher load than in the above-described evaluation of corrosion resistance (1)

On the other hand, as shown in Table 5, in Comparative Example 4 having a too thick thickness of the iron-nickel diffusion layer 12 due to an excessive thermal diffusion treatment, it is conceivable that the iron was exposed to the surface of the nickel layer 14, and when a battery container was prepared by performing a drawing and ironing processing with a high load, Comparative Example 4 gave a result that the corrosion resistance was poor.

REFERENCE SIGNS LIST

1 . . . surface-treated steel sheet
11 . . . steel sheet
12 . . . iron-nickel diffusion layer
13 . . . nickel plating layer
14 . . . nickel layer
2 . . . alkaline battery
21 . . . positive electrode can
211 . . . positive electrode terminal
22 . . . negative electrode terminal
23 . . . positive electrode mixture
24 . . . negative electrode mixture
25 . . . separator
26 . . . current collector
27 . . . gasket
28 . . . insulating ring
29 . . . exterior case

The invention claimed is:
1. A battery container, comprising:
a bottomed cylindrical shaped article made of a surface-treated steel sheet, wherein the surface-treated steel sheet comprises:
a steel sheet,
an iron-nickel diffusion layer formed on the steel sheet; and
a nickel layer formed on the iron-nickel diffusion layer and constituting an outermost layer, wherein the nickel layer consists of nickel,
wherein when an Fe intensity and a Ni intensity are continuously measured from a surface of the surface-treated steel sheet along a depth direction with a high frequency glow discharge optical emission spectrometric analyzer, a thickness of the iron-nickel diffusion layer being a difference (D2−D1) between a depth (D1) at which the Fe intensity exhibits a first predetermined value and a depth (D2) at which the Ni intensity exhibits a second predetermined value is 0.04 to 0.31 μm;
a total amount of the nickel contained in the iron-nickel diffusion layer and the nickel contained in the nickel layer is 4.4 g/m² or more and less than 10.8 g/m²,
a Vickers hardness (HV) of the nickel layer measured with a load of 10 gf is 200 to 280,
wherein the depth (D1) exhibiting the first predetermined value is a depth exhibiting an intensity of 10% of a saturated value of the Fe intensity measured by the above-described measurement, and
the depth (D2) exhibiting the second predetermined value is a depth exhibiting an intensity of 10% of a maximum value when the measurement is further performed along the depth direction after the Ni intensity shows the maximum value by the above-described measurement, and
wherein the iron-nickel diffusion layer is disposed on an inner surface of the bottomed cylindrical shaped article, and the nickel layer constitutes the outermost layer of the inner surface of the bottomed cylindrical shaped article.
2. The battery container according to claim 1, wherein an average crystal grain size in a surface portion of the nickel layer is 0.2 to 0.6 μm.
3. The battery container according to claim 1, wherein a thickness of the nickel layer is 0.4 to 1.2 μm.
4. A battery provided with the battery container according to claim 1.
5. A method for producing the battery container having the surface-treated steel sheet according to claim 1, said method comprising:
forming the bottomed cylindrical shaped article having the inner surface; and
forming the surface-treated steel sheet by a method comprising:
forming a nickel plating layer on the steel sheet with a nickel amount of 4.4 g/m² or more and less than 10.8 g/m²; and
applying a heat treatment to the steel sheet having the nickel plating layer formed thereon by maintaining the steel sheet at a temperature of 480 to 590° C. for 30 seconds to 2 minutes to thereby form the iron-nickel diffusion layer having a thickness of 0.04 to 0.31 μm, and forming the nickel layer on the iron-nickel diffusion layer to constitute the outermost layer of the inner surface of the bottomed cylindrical shaped article,
wherein the nickel plating layer is formed on the inner surface of the bottomed cylindrical shaped article and consists of nickel.

* * * * *